United States Patent
Lin

(10) Patent No.: US 12,222,786 B2
(45) Date of Patent: Feb. 11, 2025

(54) INFORMATION READING METHOD, DEVICE, CABLE, CHARGING SYSTEM, AND COMPUTER STORAGE MEDIUM

(71) Applicant: GUANGDONG OPPO MOBILE TELECOMMUNICATIONS CORP., LTD., Dongguan (CN)

(72) Inventor: Shangbo Lin, Dongguan (CN)

(73) Assignee: GUANGDONG OPPO MOBILE TELECOMMUNICATIONS CORP., LTD., Dongguan (CN)

( * ) Notice: Subject to any disclaimer, the term of this patent is extended or adjusted under 35 U.S.C. 154(b) by 86 days.

(21) Appl. No.: 18/135,868

(22) Filed: Apr. 18, 2023

(65) Prior Publication Data
US 2023/0273662 A1 Aug. 31, 2023

Related U.S. Application Data

(63) Continuation of application No. PCT/CN2021/118587, filed on Sep. 15, 2021.

(30) Foreign Application Priority Data

Nov. 9, 2020 (CN) .......................... 202011241400.3

(51) Int. Cl.
*G06F 1/26* (2006.01)
(52) U.S. Cl.
CPC .................................... *G06F 1/266* (2013.01)
(58) Field of Classification Search
CPC ............. G06F 1/266; G06F 2213/0042; G06F 13/4068; G06F 13/4282; G06F 13/382;
(Continued)

(56) References Cited

U.S. PATENT DOCUMENTS

2017/0038810 A1* 2/2017 Ueki ................... G06F 1/266
2018/0101493 A1* 4/2018 Tominaga ............ G06F 1/266
(Continued)

FOREIGN PATENT DOCUMENTS

CN 107544934 A 1/2018
CN 110311436 A 10/2019
(Continued)

OTHER PUBLICATIONS

Silicon Labs, "What the Role of CC Pin in Type-C Solution", Jul. 9, 2021, retrieved from the Internet on Sep. 11, 2024 at <https://community.silabs.com/s/article/what-s-the-role-of-cc-pin-in-type-c-solution?language=en_US> (Year: 2021).*

(Continued)

Primary Examiner — Faisal M Zaman
(74) Attorney, Agent, or Firm — Sheppard, Mullin, Richter & Hampton LLP

(57) ABSTRACT

The present disclosure provides an information reading method, a device, a cable, a charging system, and a computer storage medium. The device includes a device control chip and a first interface. The first interface includes a first-type data signal terminal and a second-type data signal terminal. The first-type data signal terminal is connected to a power supply terminal of a communication control chip of the cable. The second-type data signal terminal is connected to a data signal terminal of the communication control chip. The device control chip is configured to control the first-type data signal terminal to be in a first output state. The first-type data signal terminal is configured to provide, when in the first output state, a first voltage to the power supply terminal, to supply power to the communication control chip.

15 Claims, 10 Drawing Sheets

(58) Field of Classification Search
CPC ............... H02J 7/00032; H02J 7/00034; H02J 2207/10; H02J 2207/30; H02J 7/00045; H02J 7/007; H04L 12/10; H04L 12/40045; Y02D 10/00
See application file for complete search history.

(56) References Cited

U.S. PATENT DOCUMENTS

| | | | |
|---|---|---|---|
| 2018/0287375 A1* | 10/2018 | Su | H02H 1/0084 |
| 2019/0354163 A1* | 11/2019 | Bodnaruk | G06F 13/4282 |
| 2023/0042872 A1* | 2/2023 | Sun | H02J 7/342 |

FOREIGN PATENT DOCUMENTS

| | | |
|---|---|---|
| CN | 111262304 A | 6/2020 |
| CN | 111522768 A | 8/2020 |
| CN | 112463674 A | 3/2021 |
| EP | 3128394 A1 | 2/2017 |
| JP | 2003241870 A | 8/2003 |

OTHER PUBLICATIONS

Extended European Search Report dated Mar. 14, 2024 received in European Patent Application No. EP21888305.6.
The Grant Notice from corresponding Chinese Application No. 202011241400.3, dated Jan. 10, 2024. English translation attached.
International Search Report and Written Opinion dated Nov. 29, 2021 in International Application No. PCT/CN2021/118587. English translation attached.

\* cited by examiner

INFORMATION READING METHOD, DEVICE, CABLE, CHARGING SYSTEM, AND COMPUTER STORAGE MEDIUM

CROSS-REFERENCE TO RELATED APPLICATION

This application is a continuation of International Application No. PCT/CN2021/118587 filed on Sep. 15, 2021, which is based on and claims a priority to Chinese Patent Application No. 202011241400.3, filed on Nov. 9, 2020, the entire disclosures of which are incorporated herein by reference.

FIELD

The present disclosure relates to smart terminal technologies, and more particularly, to an information reading method, a device, a cable, a charging system, and a computer storage medium.

BACKGROUND

With the popularity of electronic products and the accelerated pace of social life, people are demanding increasingly higher efficiency of charging electronic products, and fast charging technology has therefore become a popular technology in recent years.

During fast charging, there is a requirement for an impedance of a cable when a current for the fast charging is relatively high (usually greater than 3 A). Therefore, present fast charging protocols all require recognition of the cable when the current exceeds a threshold. Typically, a chip is integrated in a cable enabling high-current fast charging. The chip stores relevant information of the cable, such as manufacturer information, a maximum load current, and encryption information. During charging, a power supply device and a chargeable device need to read the relevant information in the chip to identify whether the cable meets requirements.

In the related art, there are different types of Universal Serial Bus (USB) interfaces, such as a Type-A interface, a Type-C interface, and a Micro-B interface. Power supply devices and chargeable devices can be connected, via different types of USB interfaces, to cables having corresponding types of USB interfaces, to perform charging and to read relevant information in chips of the cables. However, in the related art, when the power supply devices and the chargeable devices are connected via the different types of USB interfaces to the cables having the corresponding types of USB interfaces to read the relevant information in the chips of the cables, special modifications to the USB interfaces or cables are required, which results in low compatibility and low power supply efficiency.

SUMMARY

Embodiments of the present disclosure provide an information reading method, a device, a cable, a charging system, and a computer storage medium.

Technical solutions of the embodiments of the present disclosure are implemented as follows.

An embodiment of the present disclosure provides a first device. The first device is connected to a cable. The first device includes: a device control chip; and a first interface including a first-type data signal terminal and a second-type data signal terminal. The first-type data signal terminal is connected to a power supply terminal of a communication control chip of the cable. The second-type data signal terminal is connected to a data signal terminal of the communication control chip. The device control chip is configured to control the first-type data signal terminal to be in a first output state. The first-type data signal terminal is configured to provide, when in the first output state, a first voltage to the power supply terminal, to supply power to the communication control chip.

An embodiment of the present disclosure provides a cable. The cable is connected to a first device. The cable includes a communication control chip. The communication control chip includes a power supply terminal and a data signal terminal. The power supply terminal is connected to a first-type data signal terminal in a first interface of the first device. The data signal terminal is connected to a second-type data signal terminal in the first interface of the first device. The communication control chip is configured to control itself to be powered up, in response to receiving, via the power supply terminal, a first voltage outputted by the first-type data signal terminal.

An embodiment of the present disclosure provides a charging system. The charging system includes a chargeable device, a power supply device, and a cable. The chargeable device includes a charging control chip and a charging interface. The cable includes a communication control chip. The power supply device includes a power supply control chip and a power supply interface. The charging interface and the power supply interface each include a first-type data signal terminal and a second-type data signal terminal. The communication control chip has a power supply terminal connected to the first-type data signal terminal of the charging device and the first-type data signal terminal of the power supply interface, and has a data signal terminal connected to the second-type data signal terminal of the charging interface and the second-type data signal terminal of the power supply interface; the chargeable device is configured to provide a first voltage to the power supply terminal via the first-type data signal terminal of the charging interface while controlling, via the charging control chip, the first-type data signal terminal of the charging interface to be in a first output state, to supply power to the communication control chip; and/or the power supply device is configured to provide a first voltage to the power supply terminal via the first-type data signal terminal of the power supply interface while controlling, by means of the power supply control chip, the first-type data signal terminal of the power supply interface to be in a first output state, to supply power to the communication control chip.

DETAILED DESCRIPTION

In order to make objects, technical solutions, and advantages of the present disclosure more apparent, the present disclosure will be described in detail below with reference to the accompanying drawings. Embodiments described herein should not be construed as limitations of the present disclosure. All other embodiments obtained by those skilled in the art without creative labor shall fall within the protection scope of the present disclosure.

The following description when referring to "some embodiments" describes a subset of all possible embodiments, but it should be understood that "some embodiments" may be the same subset as or a different subset from all possible embodiments and may be combined with each other without conflict.

All technical and scientific terms used herein have the same meaning as commonly understood by those skilled in the art to which the present disclosure belongs, unless otherwise defined. The terms used herein are for the purpose of describing the embodiments of the present disclosure only and are not intended to limit the present disclosure.

Before detailed description of the embodiments of the present disclosure, phrases and terms involved in the embodiments of the present disclosure will be explained. The following explanations are applicable to the phrases and terms involved in the embodiments of the present disclosure.

1) (Digital Positive, DP), a positive data signal, usually referred to as (D+).

2) (Digital Minus, DM), a negative data signal, usually referred to as (D−).

3) Universal Serial Bus (USB), an external bus standard used to standardize a connection and communication between a computer and an external device. It is an interface technology applied in the field of Personal Computers (PCs).

4) USB Power Delivery (USB PD) protocol, a fast charging specification developed by USB Implementers Forum (USB-IF), and one of the present mainstream fast charging protocols. The USB PD protocol is based on USB3.1, which is a power transfer concept introduced after type-c port in USB3.1.

5) Battery Charging v1.2 (BC1.2) protocol, developed by the BC working group subordinate to USB-IF, and mainly used to standardize needs of battery charging. The protocol was first implemented based on the USB2.0 protocol.

6) Power supply device: a device that provides electric energy, such as a power adapter.

7) Chargeable device: a device with a built-in battery, such as a mobile phone and a smart speaker.

8) Cable Integrated Circuit (IC): a chip that stores relevant information of the cable (such as manufacturer information, a maximum load current, and encryption information).

9) Vbus represents a power line or a power supply bus and is used for power supply; D+ line/D− line represent a pair of differential signal lines; and Gnd represents a ground line. Any existing USB interface contains these four lines and corresponding pins.

Common USB interfaces include a Type-C interface, a Type-A interface, and a micro-B interface.

Figure 1:
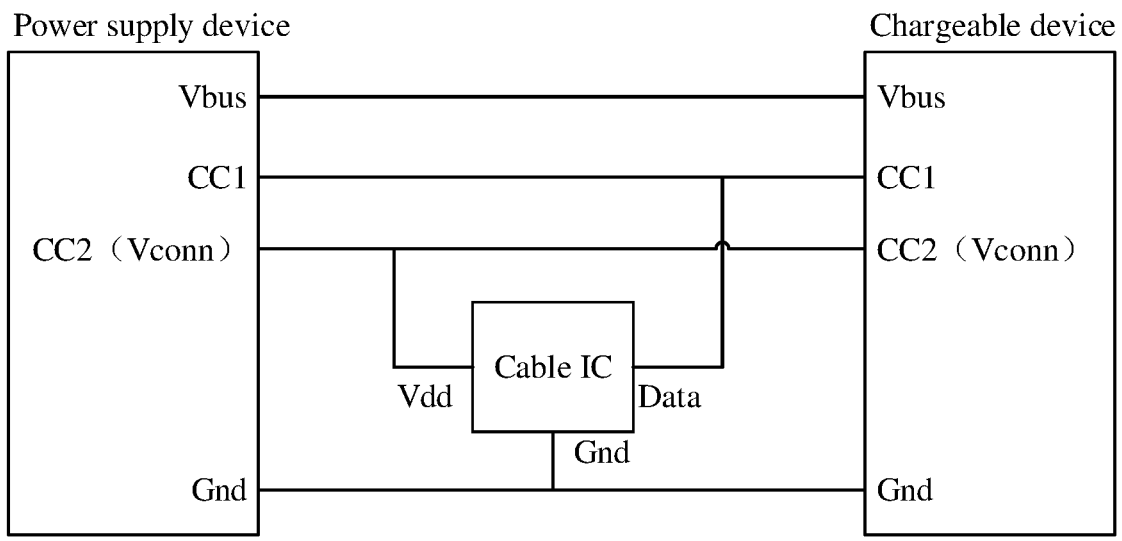
FIG. 1 is an exemplary diagram of a pin connection relation between a power supply device and a chargeable device connected via a cable having a Type-C interface according to the present disclosure.

The Type-C interface has two Configuration Channel (CC) signal lines: CC1 and CC2. When a power supply device and a chargeable device are connected via a cable having the Type-C interface (the cable IC of which is a cable IC under the USB PD protocol), one of the two CC signal lines is used for communication among the power supply device, the chargeable device and the cable IC, while the other CC line is used to supply power to the cable IC. FIG. 1 is an exemplary diagram of a pin connection relation between a power supply device and a chargeable device connected via a cable having a Type-C interface according to the present disclosure. As illustrated in FIG. 1, signal line CC1 is used for communication among the power supply device, the chargeable device and the cable IC, and CC2 is transitioned to provide a Vconn function and dedicatedly supplies power to the cable IC.

The Type-A interface and the micro-B interface each have only four signal lines, Vbus, Dp, Dm, and Gnd, and no CC1 and CC2 signal lines. In this case, if the cable IC is added to the cable, power supply to and communication with the cable IC are usually conducted in the following two manners.

Figure 2:
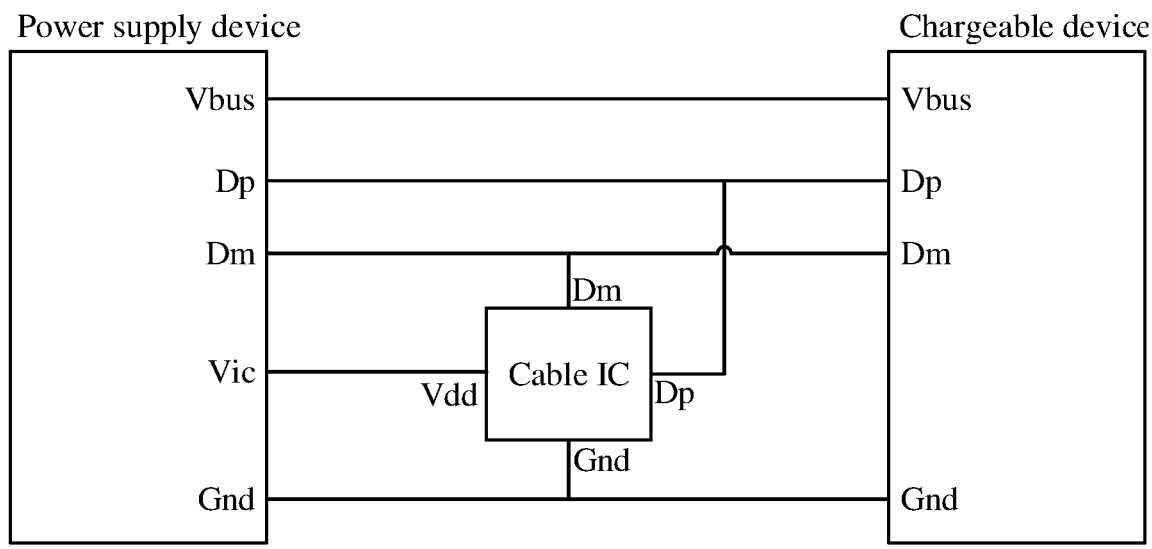
FIG. 2 is an exemplary diagram of a pin connection relation between a power supply device and a chargeable device connected via a cable having a Type-A or micro-B interface according to the present disclosure.

Manner 1: in the Type-A or micro-B interface, a pin is added to supply power to the cable IC. In terms of communication, one of Dp and Dm is used to achieve single-line communication, or both of Dp and Dm are used to achieve dual-line communication. FIG. 2 is an exemplary diagram of a pin connection relation between a power supply device and a chargeable device connected via a cable having a Type-A or micro-B interface according to the present disclosure. As illustrated in FIG. 2, a pin Vic is added to a USB interface of the power supply device and is dedicated to supplying power to the cable IC (or, a pin Vic may be added to a USB interface of the chargeable device to supply power to the cable IC), and then the power supply device and the chargeable device can communicate with the cable IC via Dp and Dm.

Figure 3:
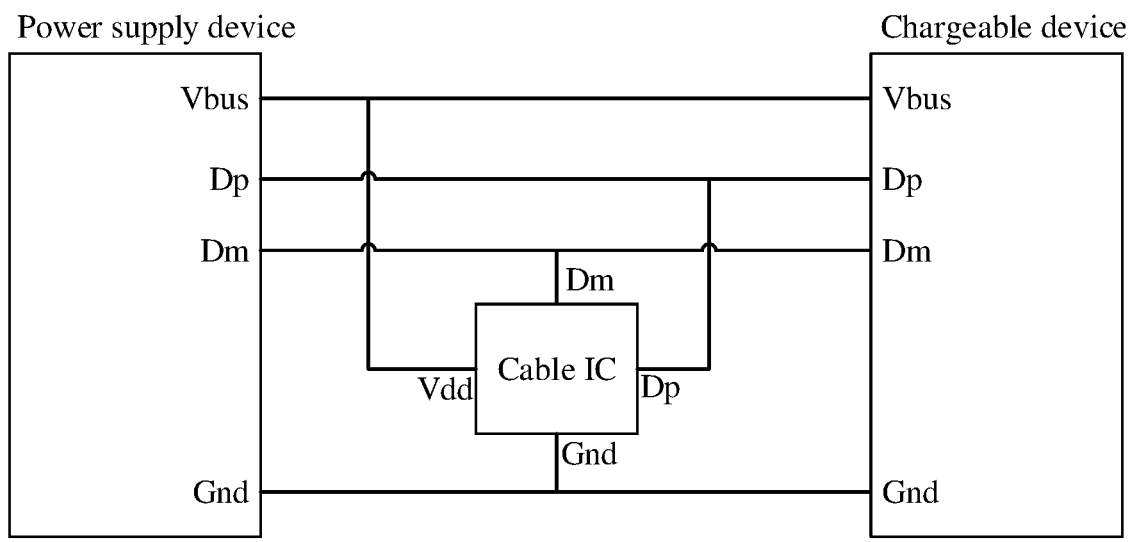
FIG. 3 is an exemplary diagram of another pin connection relation between a power supply device and a chargeable device connected via a cable having a Type-A or micro-B interface according to the present disclosure.

Manner 2: Vbus is used to supply power to the cable IC. In terms of communication, one of Dp and Dm is used to achieve single-line communication, or both of Dp and Dm are used to achieve dual-line communication. FIG. 3 is an exemplary diagram of another pin connection relation between a power supply device and a chargeable device connected via a cable having a Type-A or micro-B interface according to the present disclosure. As illustrated in FIG. 3, the cable IC draws power directly from Vbus, and the power supply device and the chargeable device communicate with the cable IC via Dp and Dm.

The above contents reveal that the cable IC under the USB PD protocol is only suitable for situations where both the power supply device and the chargeable device have the Type-C interface. Since neither the Type-A interface nor the micro-B interface has the two signal lines CC1 and CC2, the pin connection method and the corresponding communication method in FIG. 1 are inapplicable to the Type-A and micro-B interfaces. The pin connection relation and the corresponding communication method in Manner 2 described above, which require a custom Type-A or micro-B interface and a custom cable, are inapplicable to standard Type-A and micro-B interfaces and a standard cable. In the pin connection relation and the corresponding communication method in Manner 2 described above, the cable IC needs to be designed for power supply of a wide voltage range (e.g., from 3.3 V to 30 V) to accommodate high-voltage fast charging (e.g., a voltage of Vbus is 9 volts (V), 15 V. 20 V, or even higher), for a reason that Vbus supplies power to the cable IC directly. This poses higher design requirements for the cable IC, and requires an additional voltage conversion module built in or outside the cable IC to be added for the power supply of a wide voltage range, to convert an external power supply voltage provided by Vbus into an internal operating voltage of the cable IC (typically 3.3 V or 5 V). In addition, when a voltage difference between the external power supply voltage and the internal operating voltage is relatively large, power consumption of the voltage conversion module increases and more heat is generated, which can cause an increase in heat generation of the cable.

The embodiments of the present disclosure provide an information reading method, a device, a cable, a charging system, and a computer storage medium, capable of improving compatibility between an interface of the device and the cable, and increasing efficiency of supplying power to a communication control chip.

Exemplary applications of the device (hereinafter referred to as "first device") and the cable provided by the embodiments of the present disclosure will be described below. The first device provided by the embodiments of the present disclosure may be a chargeable device or a power supply device. The chargeable device may be implemented as a laptop, a tablet computer, a desktop computer, a set-top box, a mobile device (e.g., a mobile phone, a portable music player, a personal digital assistant, a dedicated messaging device, a portable gaming device, and a wearable device), and other types of user terminals having rechargeable batteries. The power supply device may be various types of power adapters. The cable may be a data cable with plugs and used for connecting the power supply device to the chargeable device.

Figure 4:
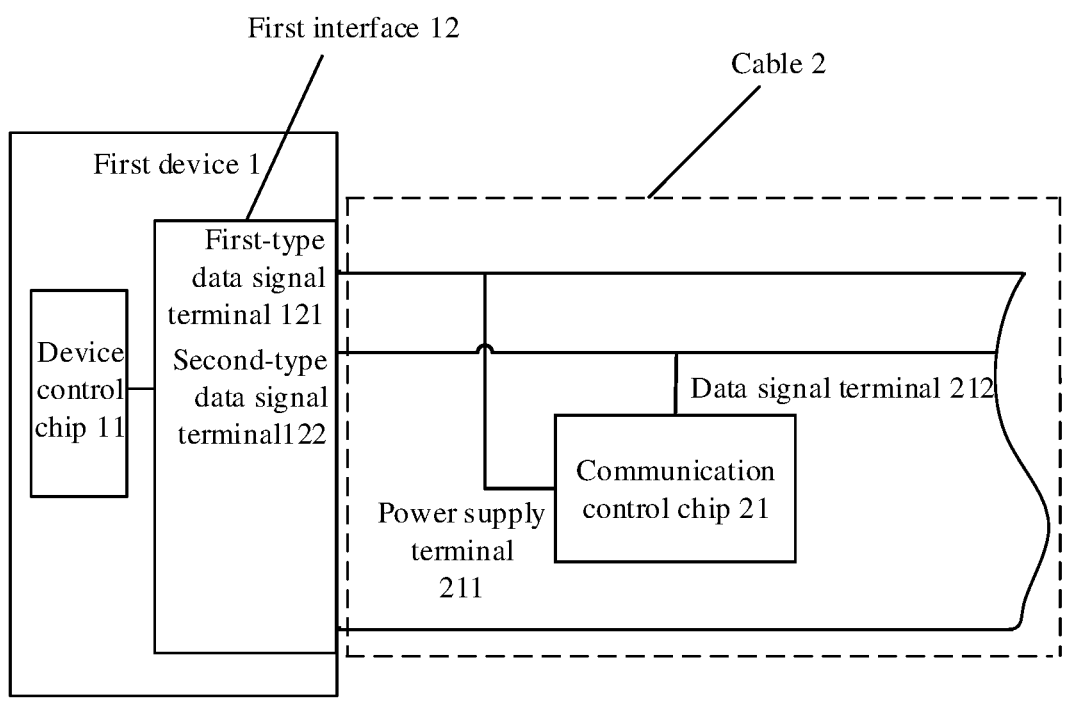
FIG. 4 is an exemplary schematic diagram of a connection relation between a first device and a cable according to an embodiment of the present disclosure.

FIG. 4 is an exemplary schematic diagram of a connection relation between a first device 1 and a cable 2 according to an embodiment of the present disclosure. As illustrated in FIG. 4, the first device 1 includes a device control chip 11 and a first interface 12. The first interface 12 includes a first-type data signal terminal 121 and a second-type data signal terminal 122. The cable 2 includes a communication control chip 21. The communication control chip 21 includes a power supply terminal 211 and a data signal terminal 212. The first-type data signal terminal 121 is connected to the power supply terminal 211. The second-type data signal terminal 122 is connected to the data signal terminal 212. The device control chip 11 is configured to control the first-type data signal terminal 121 to be in a first output state. The first-type data signal terminal 121 is configured to provide, when in the first output state, a first voltage to the power supply terminal 211, to supply power to the communication control chip 21 through the first voltage. The communication control chip 21 is configured to control itself to be powered up, in response to receiving, via the power supply terminal 211, the first voltage outputted by the first-type data signal terminal 121.

In an embodiment of the present disclosure, the communication control chip 21 in the cable 2 is a cable IC that stores relevant information of the cable 2, e.g., a maximum load current, a maximum load voltage, and manufacturer information of the cable.

In some embodiments of the present disclosure, one of the first-type data signal terminal 121 and the second-type data signal terminal 122 is a DP terminal (i.e., a DP pin) and the other one of the first-type data signal terminal 121 and the second-type data signal terminal 122 is a DM terminal (i.e., a DM pin). For example, when the first-type data signal terminal 121 is a DP terminal, the second-type data signal terminal 122 is a DM terminal, and the first device 1 may supply power to the communication control chip 21 via the DP terminal. When the first-type data signal terminal 121 is a DM terminal, the second-type data signal terminal 122 is a DP terminal, and the first device 1 may supply power to the communication control chip 21 via the DM terminal. In the embodiments of the present disclosure, the cable 2 includes a second interface. The second interface enables a connection between the cable 2 and the first device through a coupling connection to the first interface. Since the DP and DM pins are included in all types of USB interfaces, such as Type-A interfaces, Type-C interfaces, and Micro-B interfaces, the first interface 12 of the first device 1 and the second interface of the cable 2 may be Type-A interfaces, Type-C interface, Micro-B interfaces, etc., in such a manner that when the cable 2 and the first device 1 are interconnected, no special modification to the first interface or the second interface is required, thereby improving compatibility for a connection between interfaces.

In some embodiments of the present disclosure, the cable 2 further includes a first signal line and a second signal line. The second interface of the cable further includes a third data terminal and a fourth data terminal. The third data terminal is connected to the first signal line. The fourth data terminal is connected to the second signal line. After the first interface is coupled to the second interface, the first-type data signal terminal 121 is connected to the power supply terminal 211 via the third data terminal and the first signal line, and the second-type data signal terminal 122 is connected to the data signal terminal 212 via the fourth data terminal and the second signal line.

The third data terminal may be of the same type as the first-type data signal terminal, and the fourth data terminal may be of the same type as the second-type data signal terminal. For example, the third data terminal and the first-type data signal terminal may both be DM terminals, and the fourth data terminal and the second-type data signal terminal may both be DP terminals. The first signal line may be of a corresponding type to the third data terminal, and the second signal line may be of a corresponding type to the fourth data terminal. For example, when the third data terminal is a DM terminal and the fourth data terminal is a DP terminal, the first signal line may be a DM line and the second signal line may be a DP line. In the embodiments of the present disclosure, the data signal terminal 212 of the communication control chip includes a first-type data signal terminal and a second-type data signal terminal which are interconnected by means of a signal line.

In some embodiments of the present disclosure, the first interface 12 of the first device 1 further includes a charging terminal and a first ground terminal. The second interface of the cable 2 further includes an electrical signal transmission terminal and a second ground terminal. The communication control chip 21 further includes a third ground terminal. The charging terminal is connected to the electrical signal transmission terminal. The first ground terminal and the third ground terminal are both connected to the second ground terminal.

The electrical signal transmission terminal may be a Vbus terminal. The first ground terminal, the second ground terminal, and the third ground terminal may all be Gnd terminals. Thus, when the first interface is coupled to the second interface, a Vbus terminal of the first device 1 is connected to a Vbus terminal of the cable 2, and a Gnd terminal of the first device 1 is connected to a Gnd terminal of the communication control chip 21 via a Gnd terminal of the cable 2.

In the embodiments of the present disclosure, the first output state is a high-level output state. Since the first-type data signal terminal 121 is a General-Purpose Input/Output (GPIO) pin, the first voltage may be outputted when the first-type data signal terminal 121 is in the high-level output state. In the embodiments of the present disclosure, the first voltage may be 3.3 V, or 5 V, etc.

In an embodiment of the present disclosure, the first-type data signal terminal of the device is connected to the power supply terminal of the communication control chip of the cable, to supply power to the communication control chip. The second-type data signal terminal of the device is connected to the data signal terminal of the communication control chip. The device controls the first-type data signal terminal to be in the first output state via the device control chip. In addition, the first-type data signal terminal in the first output state can supply power to the communication control chip of the cable. After the communication control chip is powered up, the first device can perform a data transmission with the data signal terminal of the communication control chip via the second-type data signal terminal. Thus, it is unnecessary to modify the interface of the first device and the interface of the cable when the first device supplies power to the communication control chip in the cable, which can to a certain extent increase efficiency of the first device in reading parameter information of the cable and supplying power to the communication control chip, and improve compatibility between the first interface of the first device and the second interface of the cable.

In some embodiments of the present disclosure, the device control chip 11 is further configured to control the first-type data signal terminal 121 to be in an input state. The first-type data signal terminal 121 is further configured to output no voltage when in the input state (i.e., stop supplying the first voltage to the power supply terminal), to power down the communication control chip 21. The communication control chip 21 controls itself to be powered down, in response to failing to receive, via the power supply terminal 211, a voltage outputted by the first-type data signal terminal 121.

Since the first-type data signal terminal 121 is a GPIO pin, the first-type data signal terminal 121 in the input state outputs no level when the device control chip 11 controls the first-type data signal terminal 121 to be in the input state. The communication control chip 21 controls itself to be powered down and stops operating, when receiving no voltage signal.

In some embodiments of the present disclosure, the device control chip 11 is further configured to control the first-type data signal terminal 121 to be in a second output state. The first-type data signal terminal 121 is further configured to provide, when in the second output state, a second voltage to the power supply terminal 211. The second voltage is lower than an operating voltage of the communication control chip 21. The communication control chip 21 is further configured to control itself to be powered down and stop operating, when receiving via the power supply terminal 211 from the first-type data signal terminal 121 the second voltage lower than its own operating voltage.

The second output state may be a low level state. The second voltage outputted by the first-type data signal terminal 121 in the low level state may be lower than the operating voltage of the communication control chip 21, such as 0.8 V or 1.5 V.

In some embodiments of the present disclosure, the device control chip 11 is further configured to perform a data transmission with the data signal terminal 212 via the second-type data signal terminal 122 after the communication control chip 21 is powered up.

After the communication control chip 21 is powered up, the device control chip 11 may transmit a parameter information obtaining message to the data signal terminal 212 of the communication control chip via the second-type data signal terminal 122. After receiving the parameter information obtaining message via the data signal terminal 212, the communication control chip 21 obtains the parameter information of the cable from a memory, and transmits the parameter information to the second data signal terminal 122 via the data signal terminal 212. The device control chip 11 obtains the parameter information of the cable from the second-type data signal terminal 122 and realizes a transmission of a data signal with the communication control chip 21.

In some embodiments of the present disclosure, the first device 1 is connected to a second device via the cable 2. The device control chip 11 is further configured to implement a transmission of a data signal with the second device via the first-type data signal terminal 121 while controlling the first-type data signal terminal 121 to be in the input state; and is further configured to implement a transmission of a data signal with the second device via the second-type data signal terminal 122.

In some embodiments of the present disclosure, when the first device is the chargeable device and the second device is the power supply device, the device control chip 11 is a charging control chip and the first interface 12 is a charging interface. The chargeable device is configured to be connected to the power supply device via the charging interface and the cable 2 for charging. In some embodiments of the present disclosure, when the first device is the power supply device and the second device is the chargeable device, the device control chip 11 is the power supply control chip and the first interface 12 is the power supply interface. The power supply device is configured to be connected to the chargeable device via the power supply interface and the cable to perform power supply.

Communication between the first device and the second device is carried out via the first-type data signal terminal and/or the second-type data signal terminal in the following manners of: transmitting a data signal via the first-type data signal terminal or the second-type data signal terminal to achieve single-line communication; or transmitting data via the first-type data signal terminal and the second-type data signal terminal simultaneously to achieve dual-line communication.

For example, before power is supplied to the communication control chip 21 by the first device, single-line communication may be carried out between the first device and the second device via the first-type data signal terminal. When power needs to be supplied to the communication control chip 21, single-line communication is carried out using the second-type data signal terminal. After power supply to the communication control chip 21 is completed, the single-line communication continues to be carried out using the first-type data signal terminal. For another example, before power is supplied to the communication control chip 21 by the first device, a data signal may be transmitted between the first device and the second device via the first-type data signal terminal and the second-type data signal terminal simultaneously. When power needs to be supplied to the communication control chip 21, single-line communication is carried out using the second-type data signal terminal. After power supply to the communication control chip 21 is completed, dual-line communication continues to be carried out using the first-type data signal terminal and the second-type data signal terminal simultaneously. For another example, single-line communication may be carried out constantly between the first device and the second device via the second-type data signal terminal, before power is supplied to the communication control chip 21 by the first device, during power supply to the communication control chip 21, and after the power supply to the communication control chip 21 is completed.

In some embodiments of the present disclosure, the device control chip 11 is further configured to transmit, via the first-type data signal terminal 121 and/or the second-type data signal terminal 122 before controlling the first-type data signal terminal 121 to be in the first output state, to the second device a first mode control instruction used to instruct the second device to enter an information reading mode; and is further configured to receive, via the first-type data signal terminal 121 and/or the second-type data signal terminal 122, a first response message returned by the second device based on the first mode control instruction, enter an information reading mode based on the first response message, and control, when in the information reading mode, the first-type data signal terminal 121 to be in the first output state.

The device control chip 11 is configured to transmit, before controlling the first-type data signal terminal 121 to be in the first output state, to the first-type data signal terminal 121 and/or the second-type data signal terminal 122 the first mode control instruction used to instruct the second device to enter the information reading mode. The first-type data signal terminal 121 and/or the second-type data signal terminal 122 is configured to transmit the first mode control instruction to the second device; and receive the first response message returned by the second device based on the first mode control instruction. The first-type data signal terminal 121 and/or the second-type data signal terminal 122 is further configured to transmit the first response message to the device control chip 11. The device control chip 11 is further configured to enter the information reading mode based on the first response message, and control, when in the information reading mode, the first-type data signal terminal 121 to be in the first output state, to enable the first-type data signal terminal 121 to output the first voltage.

In other embodiments of the present disclosure, the device control chip 11 is further configured to receive, via the first-type data signal terminal 121 and/or the second-type data signal terminal 122, a second mode control instruction transmitted by the second device and used to instruct the first device to enter the information reading mode, enter the information reading mode based on the second mode control instruction, and control, when in the information reading mode, the first-type data signal terminal 121 to be in the first output state.

The first-type data signal terminal 121 and/or the second-type data signal terminal 122 are further configured to receive the second mode control instruction transmitted by the second device and used to instruct the first device 1 to enter the information reading mode; and transmit the second mode control instruction to the device control chip 11. The device control chip 11 is further configured to enter the information reading mode based on the second mode control instruction, and control, when in the information reading mode, the first-type data signal terminal 121 to be in the first output state.

Figure 5:
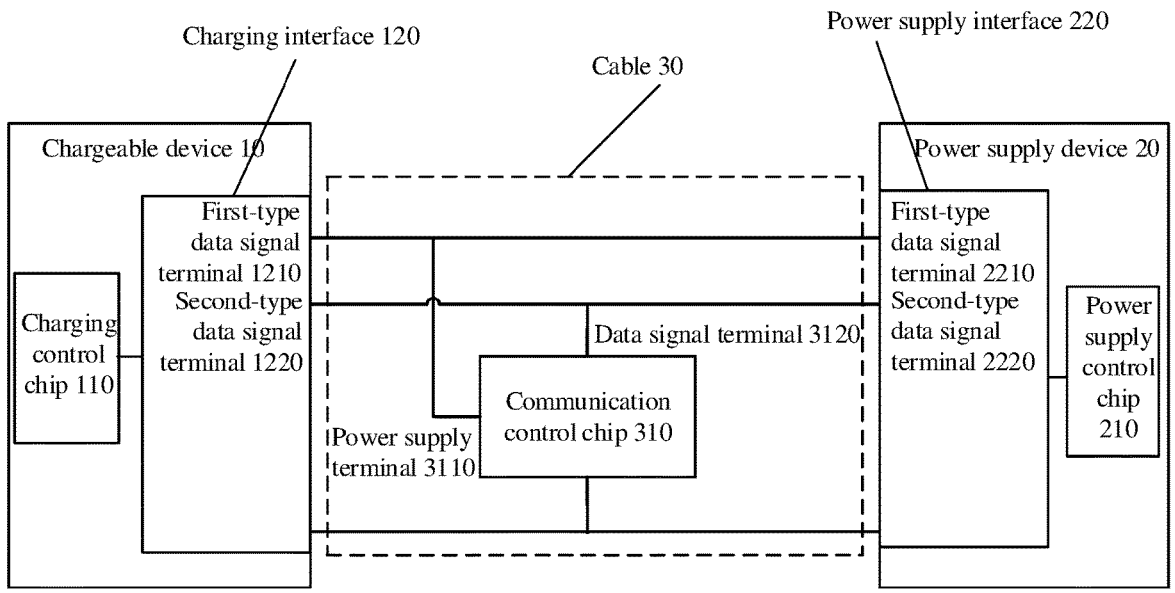
FIG. 5 is an exemplary block diagram of a structure of a charging system according to an embodiment of the present disclosure.

Based on the first device provided above, the embodiments of the present disclosure further provide a charging system. Reference can be made to FIG. 5, which is an exemplary block diagram of a structure of a charging system according to an embodiment of the present disclosure. As illustrated in FIG. 5, the charging system 1 includes a chargeable device 10, a power supply device 20, and a cable 30. The chargeable device 10 includes a charging control chip 110 and a charging interface 120. The power supply device 20 includes a power supply control chip 210 and a power supply interface 220. The charging interface 120 includes a first-type data signal terminal 1210 and a second-type data signal terminal 1220. The power supply interface 220 includes a first-type data signal terminal 2210 and a second-type data signal terminal 2220. The cable 30 includes a communication control chip 310. The communication control chip 310 includes a power supply terminal 3110 and a data signal terminal 3120. The first-type data signal terminals 1210, 2210 are both connected to the power supply terminal 3110 of the communication control chip 310. The second-type data signal terminals 1220, 2220 are both connected to the data signal terminal 3120 of the communication control chip 310.

The chargeable device 10 may be the first device and the power supply device 20 may be the second device. Correspondingly, the charging control chip 110 may be the device control chip, and the charging interface 120 may be the first interface; and the chargeable device 10 is configured to be connected to the power supply device 20 via the charging interface 120 and the cable 30 for charging. Or, the power supply device 20 may be the first device and the chargeable device 10 may be the second device. Correspondingly, the power supply control chip 210 is the device control chip and the power supply interface 220 is the first interface; and the power supply device 20 is configured to be connected to the chargeable device 10 via the power supply interface 220 and the cable 30 to perform power supply.

In an embodiment of the present disclosure, the charging interface and the power supply interface each may be a Type-A interface, a Type-C interface, or a Micro-B interface. For example, the charging interface and the power supply interface may be Type-A interfaces.

In an embodiment of the present disclosure, the first-type data signal terminals 1210, 2210 are input/output pins. One of the first-type data signal terminal 1210 and the second-type data signal terminal 1220 is a DP terminal and the other one of the first-type data signal terminal 1210 and the second-type data signal terminal 1220 is a DM terminal. Similarly, one of the first-type data signal terminal 2210 and the second-type data signal terminal 2220 is a DP terminal and the other of the first-type data signal terminal 2210 and the second-type data signal terminal 2220 is a DM terminal. For example, when the first-type data signal terminals 1210, 2210 are DP terminals, the second-type data signal terminals 1220, 2220 are DM terminals; and when the first-type data signal terminals 1210, 2210 are DM terminals, the second-type data signal terminals 1220, 2220 are DP terminals.

Figure 6:
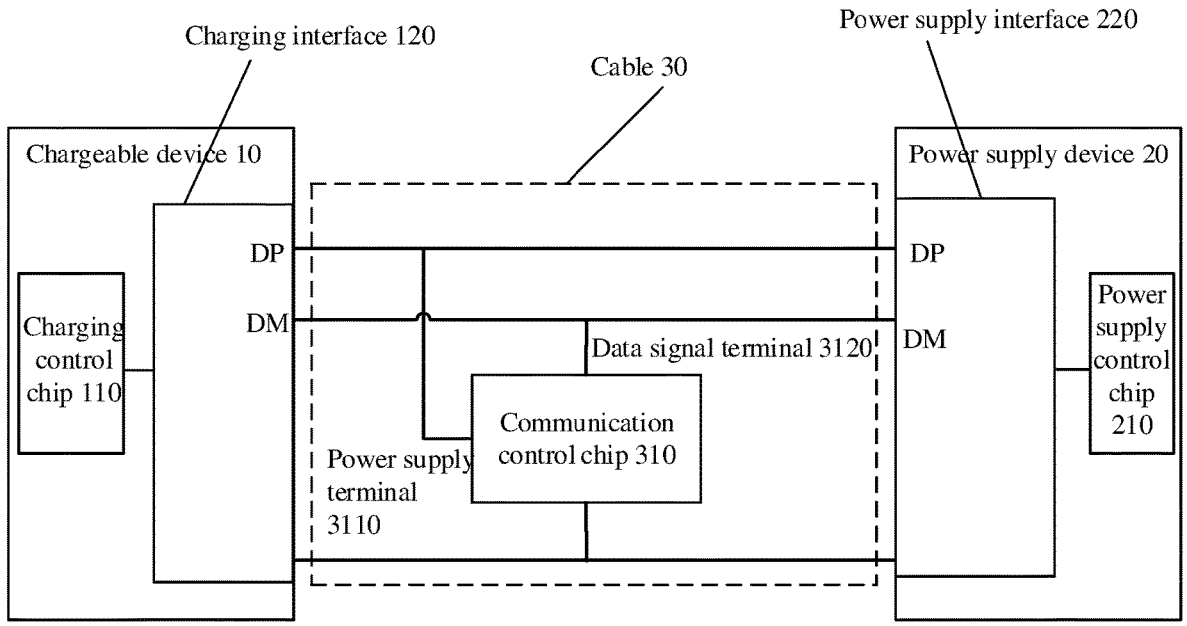
FIG. 6 is an exemplary diagram of a pin connection relation between a chargeable device and a power supply device connected via a cable according to an embodiment of the present disclosure.
Figure 7:
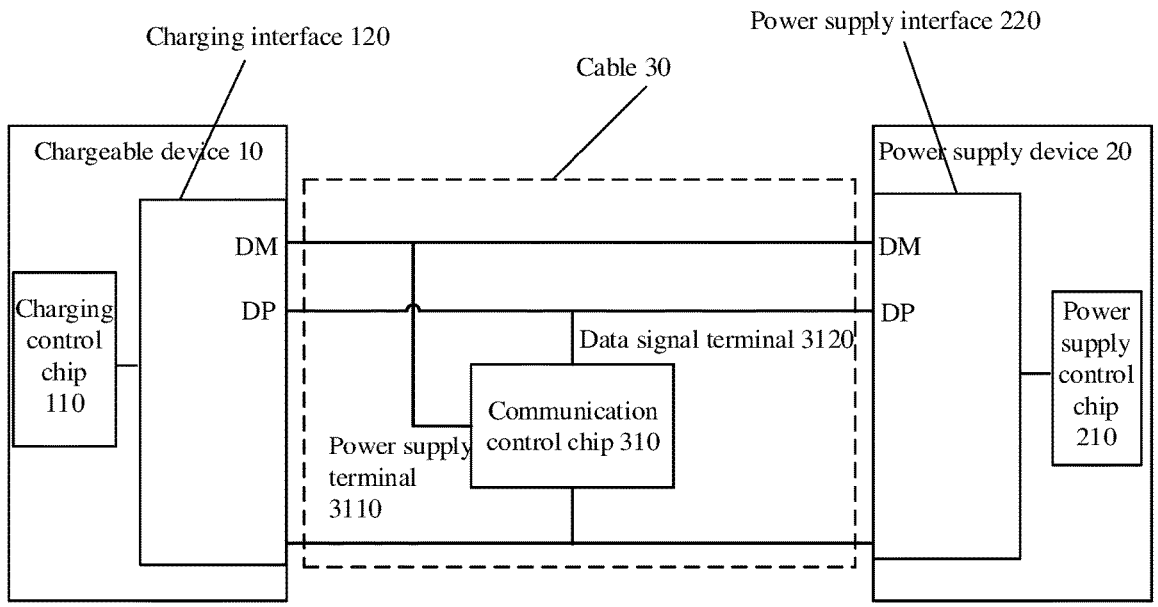
FIG. 7 is an exemplary diagram of another pin connection relation between a chargeable device and a power supply device connected via a cable according to an embodiment of the present disclosure.

For example, FIG. 6 is a diagram of a pin connection relation between a chargeable device and a power supply device connected via a cable according to an embodiment of the present disclosure; and FIG. 7 is a diagram of another pin connection relation between a chargeable device and a power supply device connected via a cable according to an embodiment of the present disclosure. In FIG. 6, when the first-type data signal terminals 1210, 2210 are DP terminals, the second-type data signal terminals 1220, 2220 are DM terminals. In FIG. 7, when the first-type data signal terminals 1210, 2210 are DM terminals, the second-type data signal terminals 1220, 2220 are DP terminals.

In an embodiment of the present disclosure, the chargeable device 10 is configured to provide a first voltage to the power supply terminal 3110 via the first-type data signal terminal 1210 while controlling, by means of the charging control chip 110, the first-type data signal terminal 1210 (i.e., a third data signal sub-terminal) to be in a first output state. The first voltage supplies power to the communication control chip 310 to power up the communication control chip 310. Or, the power supply device 20 is configured to provide a first voltage to the power supply terminal 3110 via the first-type data signal terminal 2210 while controlling, by means of the power supply control chip 210, the first-type data signal terminal 2210 (i.e., a fourth data signal sub-terminal) to be in the first output state. The first voltage supplies power to the communication control chip 310 to power up the communication control chip 310. In this way, either the power supply device or the chargeable device supplies power to the communication control chip.

In some embodiments of the present disclosure, the chargeable device 10 is configured to provide the first voltage to the power supply terminal 3110 via the first-type data signal terminal 1210 while controlling, by means of the charging control chip 110, the first-type data signal terminal 1210 to be in the first output state. In addition, the power supply device 20 is configured to provide the first voltage to the power supply terminal 3110 via the first-type data signal terminal 2210 while controlling, by means of the power supply control chip 210, the first-type data signal terminal 2210 to be in the first output state. The first voltage supplies power to the communication control chip 310 to power up the communication control chip 310. In this way, the chargeable device 10 and the power supply device 20 jointly supply power to the communication control chip 30.

In an embodiment of the present disclosure, the DP and DM pins that are used are original pins common to all types of USB interfaces. Thus, the charging system provided by the embodiment of the present disclosure can be applied in common interfaces and cables of current devices such as adapters and mobile phones, e.g., Type-A, Type-C, and Micro-B interfaces and cables, without making special modifications to the interfaces. In this way, it is possible for the power supply device 20 and/or the chargeable device 10 to supply power to the communication control chip 310 in the cable 30, without modifying the USB interface of the power supply device 20 and/or the chargeable device 10 and the cable 30, thereby improving compatibility between the USB interfaces of the power supply device and the chargeable device and the cable.

The cable 30 further includes a plurality of signal lines. The first-type data signal terminals 1210, 2210 are interconnected via the third data terminal and the first signal line of the second interface (not illustrated in FIG. 5) of the cable 30, and are connected to the power supply terminal 3110 via the third data terminal and the first signal line of the cable. The second-type data signal terminals 1220, 2220 are connected via the fourth data terminal and the second signal line of the second interface of the cable, and are connected to the data signal terminal 3120 via the fourth data terminal and the second signal line of the cable.

In an embodiment of the present disclosure, after the communication control chip 310 is powered up, a data transmission with the data signal terminal 3120 is performed via the second-type data signal terminal 1220 of the chargeable device 10 and/or the second-type data signal terminal 2220 of the power supply device 20, e.g., reading of the maximum load current, the maximum load voltage, and/or the manufacturer information of the cable from the communication control chip 310. The corresponding first-type data signal terminal 1210 or 2210 is controlled to be in the input state by means of the charging control chip 110 and/or the power supply control chip 210, and a data signal transmission is realized through the first-type data signal terminal 1210 and/or 2210.

In some embodiments of the present disclosure, the chargeable device 10 is further configured to perform a data transmission with the data signal terminal 3120 via the first-type data signal terminal 1210 (first data signal sub-terminal) after the communication control chip 310 is powered up; and control, by means of the charging control chip 110, the first-type data signal terminal 1210 corresponding to the charging control chip 110 to be in the input state, so that the transmission of the data signal is realized through the first-type data signal terminal 1210 and the communication control chip 310 is powered down. In some other embodiments of the present disclosure, the power supply device 20 is configured to perform a data transmission with the data signal terminal 3120 via the first-type data signal terminal 2210 (second data signal sub-terminal) after the communication control chip 310 is powered up; and control, by means of the power supply control chip 210, the first-type data signal terminal 2210 corresponding to the power supply control chip 210 to be in the input state, so that the transmission of the data signal is realized through the first-type data signal terminal 2210 and the communication control chip 310 is powered down. In this way, either of the chargeable device 10 and the power supply device 20 can realize communication with the communication control chip 310 and power down the communication control chip 310.

In some embodiments of the present disclosure, the chargeable device 10 is configured to perform a data transmission with the data signal terminal 3120 via the first-type data signal terminal 1210 after the communication control chip 310 is powered up. The power supply device 20 is configured to perform a data transmission with the data signal terminal 3120 via the first-type data signal terminal 2210 after the communication control chip 310 is powered up.

In some embodiments of the present disclosure, the chargeable device 10 controls, by means of the charging control chip 110, the first-type data signal terminal 1210 corresponding to the charging control chip 110 to be in the input state, so that the transmission of the data signal is achieved via the first-type data signal terminal 1210. In addition, when the power supply device 20 controls, by means of the power supply control chip 210, the first-type data signal terminal 2210 corresponding to the power supply control chip 210 to be in the input state, the chargeable device 20 and the power supply device 20 transmit data signals to each other via the first-type data signal terminals 1210, 2210, and power down the communication control chip 310. In this way, the chargeable device 10 and the power supply device 20 both achieve communication with the communication control chip 310, and communication among the chargeable device 10, the power supply device 20, and the communication control chip 310 can be realized. Also, the chargeable device 10 and the power supply device 20 together power down the communication control chip 310.

In some embodiments of the present disclosure, the chargeable device 10 is further configured to control, by means of the charging control chip 110, the first-type data signal terminal 1210 to be in the second output state, and to provide a second voltage to the power supply terminal 3110 via the first-type data signal terminal 1210. The second voltage is lower than an operating voltage of the communication control chip 310, and thus the communication control chip 310 is powered down. The second output state may be a low level state. The second voltage outputted by the first-type data signal terminal 1210 in the low level state may be lower than the operating voltage of the communication control chip 310, such as 0.8 V or 1.5 V.

In some embodiments of the present disclosure, the chargeable device 10 is configured to control, by means of the charging control chip 110, the first-type data signal terminal 1210 and/or the second-type data signal terminal 1220 to transmit a first mode control instruction to the first-type data signal terminal 2210 and/or the second-type data signal terminal 2220 of the power supply device 20 before controlling, by means of the charging control chip 110, the first-type data signal terminal 1210 to be in the first output state. The first mode control instruction is used to instruct the power supply device 20 to enter an information reading mode. The power supply device 20 is configured to receive the first mode control instruction via the first-type data signal terminal 2210 and/or the second-type data signal terminal 2220; enter the information reading mode based on the first mode control instruction, and feed a first response message back to the chargeable device 10; and control, when in the information reading mode, the first-type data signal terminal 2210 to be in a first output state by means of the power supply control chip 210. The chargeable device 10 is further configured to enter, by means of the charging control chip 110, the information reading mode based on the first response message, and control, when in the information reading mode, the first-type data signal terminal 1210 to be in the first output state.

The power supply device 20 may transmit the first response message to the first-type data signal terminal 1210 and/or the second-type data signal terminal 2220 of the chargeable device via the first-type data signal terminal 2210 and/or the second-type data signal terminal 2220 corresponding to the power supply control chip 210. Communication between the power supply device 10 and the chargeable device 20 may be carried out via the first-type data signal terminal and/or the second-type data signal terminal in the following manners of: performing communication via the first-type data signal terminal 1210 and the first-type data signal terminal 2210; or performing communication via the second-type data signal terminal 1220 and the second-type data signal terminal 2220; or performing communication via the first-type data signal terminal 1210 and the first-type data signal terminal 2210, and at the same time, via the second-type data signal terminal 1220 and the second-type data signal terminal 2220.

In some embodiments of the present disclosure, the power supply device 20 is further configured to control, by means of the power supply control chip 210, the first-type data signal terminal 2210 to be in a second output state, and provide a second voltage to the power supply terminal 3110 via the first-type data signal terminal 2210. The second voltage is lower than the operating voltage of the communication control chip 310, and thus the communication control chip 310 is powered down.

In some other embodiments of the present disclosure, the power supply device 20 is configured to control, by means of the power supply control chip 210, the first-type data signal terminal 2210 and/or the second-type data signal terminal 2220 to transmit a second mode control instruction to the first-type data signal terminal 1210 and/or the second-type data signal terminal 1220 of the charging device 10 before controlling, by means of the power supply control chip 210, the first-type data signal terminal 2210 to be in the first output state. The second mode control instruction is used to instruct the chargeable device 10 to enter an information reading mode. The chargeable device 10 is configured to receive the second mode control instruction via the first-type data signal terminal 1210 and/or the second-type data signal terminal 1220; enter the information reading mode based on the second mode control instruction, and feed a second response message back to the power supply device 20; and control, when in the information reading mode, the first-type data signal terminal 1210 to be in a first output state by means of the charging control chip 110. The power supply device 20 is further configured to enter, by means of the power supply control chip 210, the information reading mode based on the second response message, and control, when in the information reading mode, the first-type data signal terminal 2210 to be in the first output state.

In some embodiments of the present disclosure, the chargeable device 10 or the power supply device 20 may also control itself to enter the information reading mode.

Figure 8:
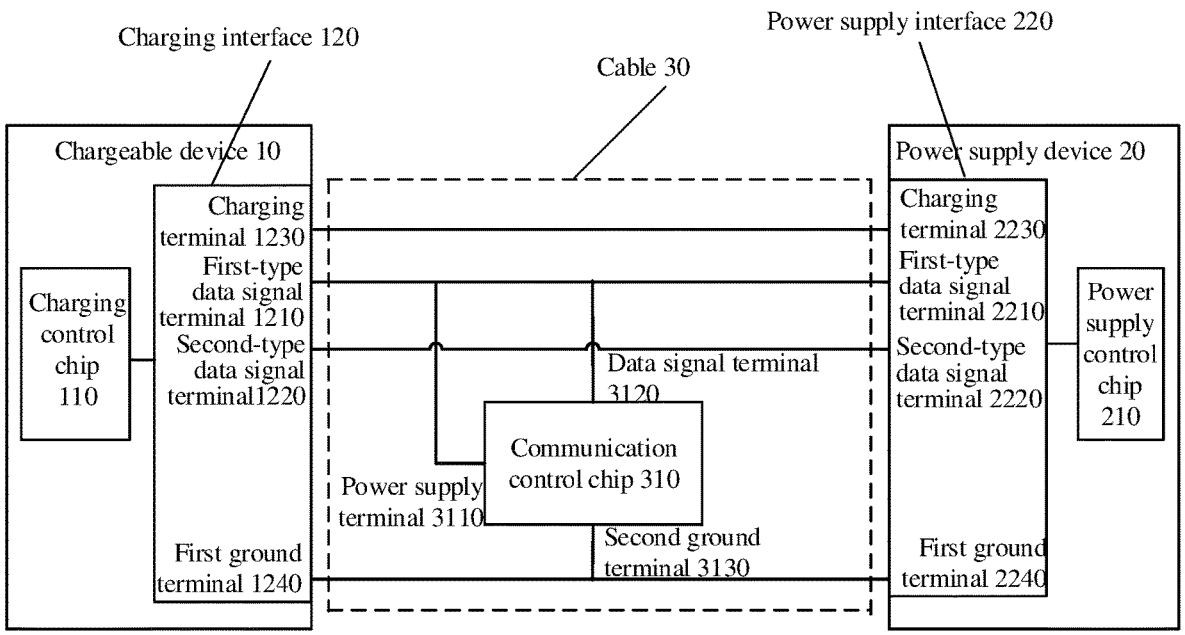
FIG. 8 is an exemplary diagram of yet another pin connection relation between a chargeable device and a power supply device connected via a cable according to an embodiment of the present disclosure.

In an embodiment of the present disclosure, the charging interface 120 further includes a charging terminal 1230 and a first ground terminal 1240. The power supply interface 220 further includes a charging terminal 2230 and a first ground terminal 2240. The communication control chip 310 further includes a second ground terminal 3130. The cable further includes a third ground terminal (not illustrated in FIG. 8). For example, FIG. 8 is a diagram of yet another pin connection relation between a chargeable device and a power supply device connected via a cable according to an embodiment of the present disclosure. As illustrated in FIG. 8, the charging terminal 2230 of the power supply device 20 is connected to the charging terminal 1230 of the chargeable device 10. The first ground terminal 2240 of the power supply device 20 is connected to the first ground terminal 1240 of the chargeable device 10, and is also connected to the second ground terminal 3130 of the communication control chip 310 via the third ground terminal of the cable.

Figure 9:
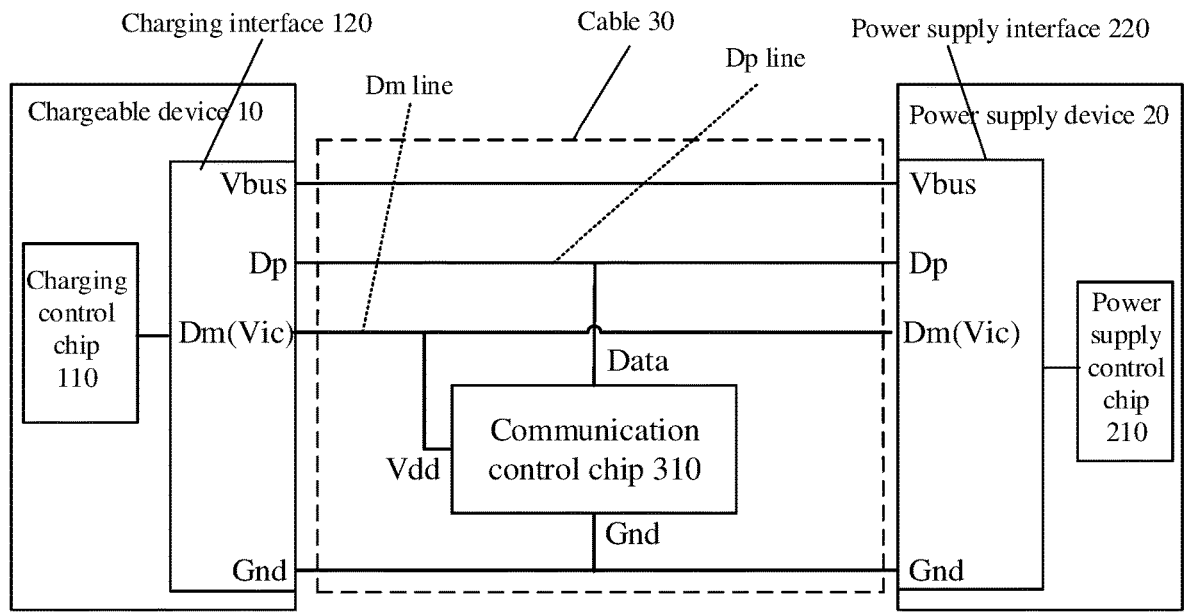
FIG. 9 is an exemplary diagram of still yet another pin connection relation between a chargeable device and a power supply device connected via a cable according to an embodiment of the present disclosure.
Figure 10:
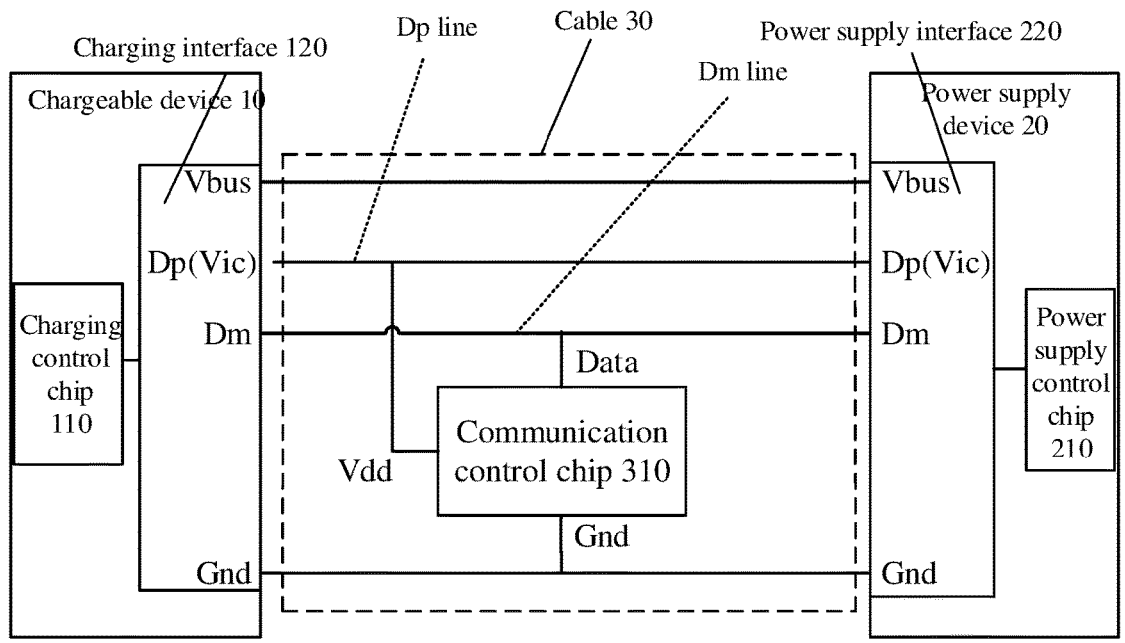
FIG. 10 is an exemplary diagram of still yet another pin connection relation between a chargeable device and a power supply device connected via a cable according to an embodiment of the present disclosure.

In accordance with the above description, two exemplary diagrams of pin connection relations between the chargeable device and the power supply device connected via the cable are provided below. FIG. 9 is an exemplary diagram of still yet another pin connection relation between a chargeable device and a power supply device connected via a cable according to an embodiment of the present disclosure. FIG. 10 is an exemplary diagram of still yet another pin connection relation between a chargeable device and a power supply device connected via a cable according to an embodiment of the present disclosure.

As illustrated in FIG. 9, the power supply terminal 3110 of the communication control chip 310 is a Vdd terminal. The data signal terminal 3120 of the communication control chip 310 is a Data terminal. The first-type data communication terminals 1210, 2210 and third data terminals are all DM (i.e., Dm in FIG. 9) terminals. The second-type data communication terminals 1220, 2220 and fourth data terminals are all DP (i.e., Dp in FIG. 9) terminals. Each DM terminal is set as a Vic pin and is configured to supply power to the Vdd terminal. The first signal line is a DM line. The second signal line is a DP line. The DM line is connected to the third data terminals which are DM terminals. The DP line is connected to the fourth data terminals which are DP terminals. DM terminals of the power supply device 20 and the chargeable device 10 are connected via the third data terminals (DM terminals) and the first signal line (DM line). The DM terminal of each of the power supply device 10 and the chargeable device 20 is connected to the first signal line (DM line) via one of the third data terminals (DM terminals). DP terminals of the power supply device 10 and the chargeable device 20 are connected via the fourth data terminals (DP terminals) and the second signal line (DP line). The DP terminal of each of the power supply device 10 and the chargeable device 20 is connected to the second signal line (DP line) via one of the fourth data terminals (DP terminals). The charging interface 120 of the chargeable device and the power supply interface 220 of the power supply device each further include a Vbus terminal and a Gnd terminal. The Vbus terminals of the chargeable device and the power supply device are connected via an electrical signal transmission terminal of the cable (e.g., the Vbus terminal, not illustrated in FIG. 9) and a connection line in the cable, to perform charging. The Gnd terminals of the chargeable device and the power supply device are connected via a connection line (e.g., a ground line) in the cable.

As illustrated in FIG. 10, the power supply terminal 3110 of the communication control chip 310 is a Vdd terminal. The data signal terminal 3120 of the communication control chip 310 is a Data terminal. The first-type data communication terminals 1210, 2210 and third data terminals are all DP (i.e., Dp in FIG. 10) terminals. The second-type data communication terminals 1220, 2220 and fourth data terminals are all DM (i.e., Dm in FIG. 10) terminals. Each DP terminal is set as a Vic pin and is configured to supply power to the Vdd terminal. The first signal line is a DP line. The second signal line is a DM line. The DP line is connected to the third data terminals which are DP terminals. The DM line is connected to the fourth data terminals which are DM terminals. The DP terminals of the power supply device 20 and the chargeable device 10 are connected via the third data terminals (DP terminals) and the first signal line (DP line). The DP terminal of each of the power supply device 10 and the chargeable device 20 is connected to the first signal line (DP line) via one of the third data terminals (DP terminals). The DM terminals of the power supply device 10 and the chargeable device 20 are connected via the fourth data terminals (DM terminals) and the second signal line (DM line). The DM terminal of each of the power supply device 10 and the chargeable device 20 is connected to the second signal line (DM line) via one of the fourth data terminals (DM terminals). The charging interface 120 of the chargeable device and the power supply interface 220 of the power supply device each further include a Vbus terminal and a Gnd terminal. The Vbus terminals of the chargeable device and the power supply device are connected via an electrical signal transmission terminal of the cable (e.g., the Vbus terminal, not illustrated in FIG. 10) and a connection line in the cable, to perform charging. The Gnd terminals of the chargeable device and the power supply device are connected via a connection line (e.g., a ground line) in the cable.

The present disclosure further provides an information reading method. The information reading method provided by the present disclosure will be illustrated through exemplary applications of the first device described above.

Figure 11:
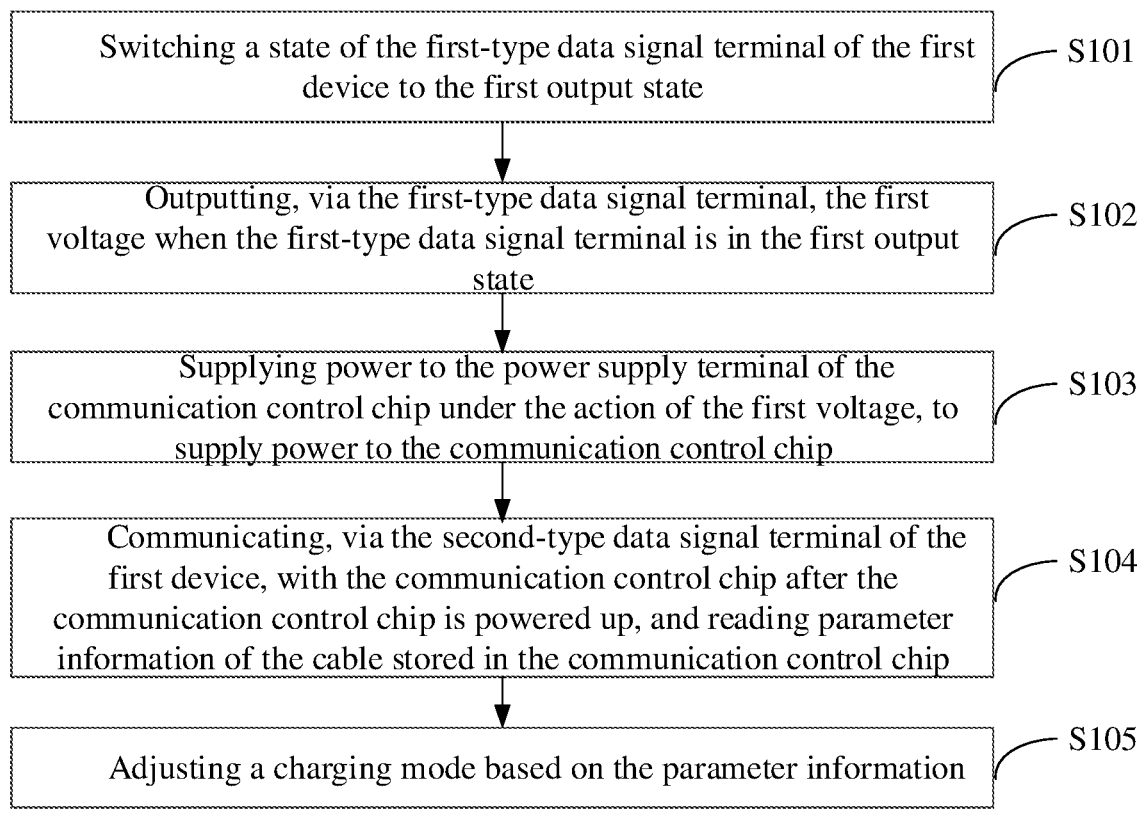
FIG. 11 is an optional flowchart of an information reading method according to an embodiment of the present disclosure.

Reference can be made to FIG. 11. FIG. 11 is an optional flowchart of an information reading method according to an embodiment of the present disclosure. Description will be made in conjunction with the connection relation illustrated in FIG. 4 and steps shown in FIG. 11.

At S101, a state of the first-type data signal terminal of the first device is switched to the first output state.

In an embodiment of the present disclosure, the first device may change configuration information of its own first-type data signal terminal 1210 or 2210, to switch the state of the first-type data signal terminal 1210 or 2210 to the first output state. In an embodiment of the present disclosure, the first output state is the high-level output state.

At S102, the first voltage is outputted via the first-type data signal terminal when the first-type data signal terminal is in the first output state.

In an embodiment of the present disclosure, after the first device switches the state of the first-type data signal terminal 1210 or 2210 to the first output state, the first-type data signal terminal 1210 or 2210 in the first output state may output the first voltage.

At S103, power is supplied to the power supply terminal of the communication control chip under the action of the first voltage, to supply power to the communication control chip.

In an embodiment of the present disclosure, the first voltage may be 3.3 V or 5 V. Thus, under the action of the first voltage, the first device may supply power to the communication control chip having the operating voltage of 3.3 V or 5 V, to enable an operation of the communication control chip.

At S104, the first device communicates, via the second-type data signal terminal of itself, with the communication control chip after the communication control chip is powered up, and reads parameter information of the cable stored in the communication control chip.

In an embodiment of the present disclosure, after the communication control chip is powered up, the first device may control its own second-type data signal terminals 1220, 2220 to transmit, via the data signal terminal 3120, an information reading instruction to the communication control chip 310. After receiving the information reading instruction, the communication control chip 310 transmits the parameter information of the cable corresponding to the information reading instruction, e.g., the maximum load current, the maximum load voltage, or the manufacturer information of the cable, to the second-type data signal terminals 1220, 2220 via the data signal terminal 3120. Thus, the first device realizes communication with the communication control chip 310, and reading of the parameter information of the cable stored in the communication control chip 310.

At S105, a charging mode is adjusted based on the parameter information.

In an embodiment of the present disclosure, when the first device is the chargeable device 10, the chargeable device 10 may reduce a magnitude of a current requested from the power supply device 20 based on the obtained parameter information of the cable 30. When the first device is the power supply device 20, the power supply device 20 may reduce a magnitude of a current provided to the chargeable device 10 based on the obtained parameter information of the cable 30. In this way, it is possible to prevent the cable 30 from being overloaded, which improves the safety of the chargeable device 10 during charging.

In some embodiments of the present disclosure, the first device is the power supply device and the second device is the chargeable device; or the first device is the chargeable device and the second device is the power supply device.

In an embodiment of the present disclosure, the original pins common to all types of USB interfaces are used. Thus, the information reading method of the present disclosure can be applied in common interfaces and cables of current devices such as adapters and mobile phones, e.g., Type-A, Type-C, and Micro-B interfaces and cables, making it possible for the first device supply power to the communication control chip in the cable without making modifications to the USB interface of the first device and the cable, thereby improving to some extent the efficiency of the first device in reading the parameter information of the cable and in supplying power to the communication control chip.

In some embodiments of the present disclosure, before the first device supplies power to the communication control chip 310, communication data from the first-type data signal terminal 1210 is transmitted to 2210 via a data cable connecting the first-type data signal terminals 1210, 2210, and communication data from the first-type data signal terminal 2210 is transmitted to 1210 via a data cable connecting the first-type data signal terminals 1210, 2210. The first device and the second device may communicate via the first-type data signal terminals 1210, 2210 in a manner of single-line communication. In other embodiments of the present disclosure, the communication data from the first-type data signal terminal 1210 is transmitted to 2210 via the data cable connecting the first-type data signal terminals 1210, 2210, and communication data from the second-type data signal terminal 1220 is transmitted to 2220 via a data cable connecting the second-type data signal terminals 2220, 1220, etc. The first device and the second device may communicate via the first-type data signal terminals 1210, 2210 and the second-type data signal terminals 1220, 2220 in a manner of dual-line communication.

Figure 12:
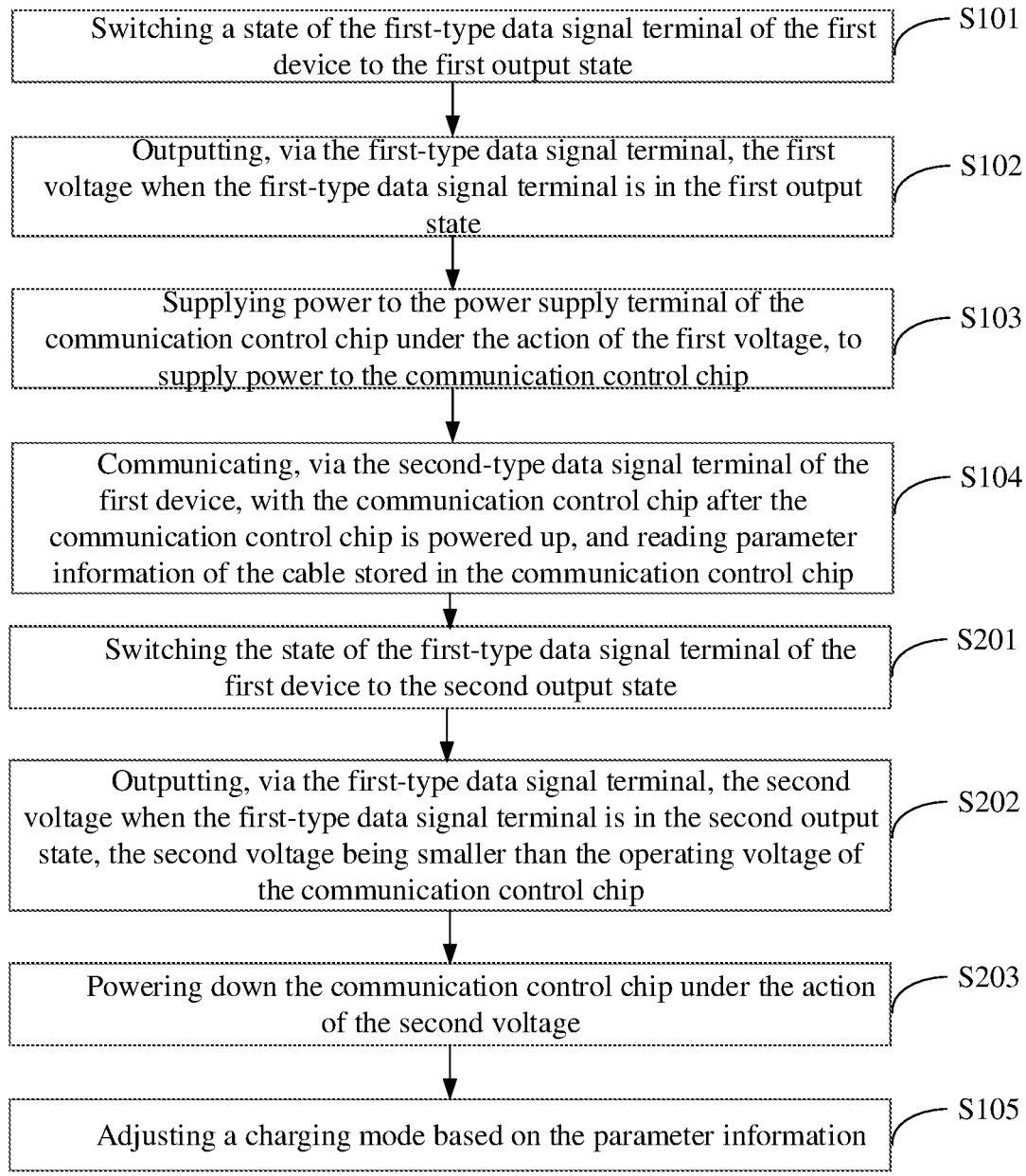
FIG. 12 is an optional flowchart of an information reading method according to an embodiment of the present disclosure.

In some embodiments of the present disclosure, FIG. 12 is an optional flowchart of an information reading method according to an embodiment of the present disclosure. As illustrated in FIG. 12, the information reading method may further include actions at block S201 to block S203 subsequent to the action at block S104 in FIG. 11. As an example, the actions at block S201 to block S203 are performed subsequent to the action at block S104 and prior to the action at block S105, description of which will be made in conjunction with steps illustrated in FIG. 12.

At S201, the state of the first-type data signal terminal of the first device is switched to the second output state.

In an embodiment of the present disclosure, after reading out the parameter information of the cable 30 from the communication control chip 310, the first device may switch the first-type data signal terminal 1210 or 2210 from the first output state to the second output state, in such a manner that the first-type data signal terminal 1210 or 2210 switches from outputting a high level to outputting a low level.

At S202, the second voltage being lower than the operating voltage of the communication control chip is outputted, via the first-type data signal terminal, when the first-type data signal terminal is in the second output state.

At S203, the communication control chip is powered down under the action of the second voltage.

In an embodiment of the present disclosure, the second voltage outputted by the first-type data signal terminal 1210 or 2210 at a low level may be 0.8 V, 1.5 V, or 0 V, etc., which is lower than the operating voltage (3.3 V or 5 V) of the communication control chip 310. Therefore, the communication control chip 310 is unable to operate under the action of the second voltage, thereby causing the communication control chip 310 to be powered down.

In an embodiment of the present disclosure, when the first-type data signal terminal 1210 or 2210 is in the second output state, the chargeable device 10 and the power supply device 20 may perform single-line communication via the second-type data signal terminals 1220, 2220.

Figure 13:
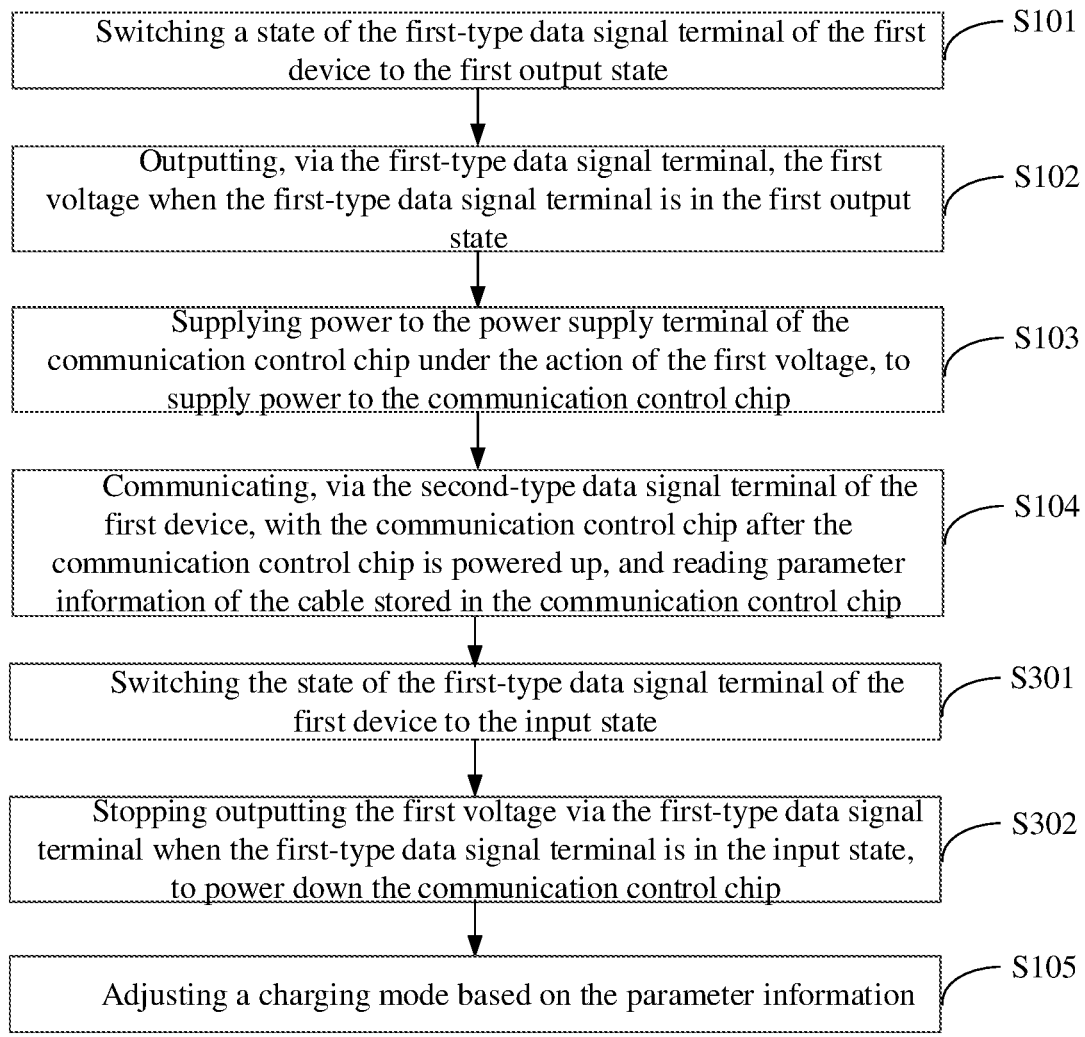
FIG. 13 is an optional flowchart of an information reading method according to an embodiment of the present disclosure.

In some embodiments of the present disclosure, FIG. 13 is an optional flowchart of an information reading method according to an embodiment of the present disclosure. As illustrated in FIG. 13, actions at block S301 and block S302 may also be performed subsequent to the action at block S104 in FIG. 10. As an example, the actions at block S301 and block S302 are performed subsequent to the action at S104 and prior to the action at S105, description of which will be made in conjunction with steps illustrated in FIG. 13.

At S301, the state of the first-type data signal terminal of the first device is switched to the input state.

In an embodiment of the present disclosure, after reading out the parameter information of the cable 30 from the communication control chip 310, the first device may switch the state of the first-type data signal terminal 1210 or 2210 from the first output state to the input state. Thus, no voltage is outputted from the first-type data signal terminal 1210 or 2210. In this way, when communication with the communication control chip 310 is not required, power supply to the communication control chip 310 may be cut off to save electric energy for the first device or the second device.

At S302, the first-type data signal terminal stops outputting the first voltage when the first-type data signal terminal is in the input state, to power down the communication control chip.

In an embodiment of the present disclosure, since the first-type data signal terminal 1210 or 2210 in the input state outputs no voltage, supply of the first voltage to the communication control chip 310 may be stopped, and thus the communication control chip 310 is unable to obtain the operating voltage. In this way, the communication control chip 310 is powered down and stops operating.

In an embodiment of the present disclosure, when the first-type data signal terminal 1210 or 2210 is in the input state, the chargeable device 10 and the power supply device 20 may communicate via the first-type data signal terminal 1210 or 2210 and the second-type data signal terminals 1220, 2220 in a manner of dual-line communication.

In an embodiment of the present disclosure, when the communication control chip 310 is powered down, and the first device needs to read the parameter information of the cable 30 in the communication control chip 310, it continues to execute the method from S101.

In some embodiments of the present disclosure, the method may further include actions at block S11 and block S12 prior to the action at block S101. The action at block S101 may be implemented by the action at block S1011.

At S11, the first mode control instruction transmitted by the second device is received. The first mode control instruction is used to instruct the first device to enter the information reading mode.

In an embodiment of the present disclosure, the first device may receive, from the first-type data signal terminal 2210 or 1210 of the second device via the first-type data signal terminal 1210 or 2210, the first mode control instruction instructing the first device to enter the information reading mode, and enter the information reading mode based on the first mode control instruction, to supply power to the communication control chip 310 subsequently. In other embodiments of the present disclosure, the first device may also receive the first mode control instruction transmitted by the second device in other manners, for example, in a wireless manner.

At S12, the information reading mode is entered based on the first mode control instruction.

In an embodiment of the present disclosure, after receiving the first mode control instruction from the second device, the first device enters the information reading mode based on the first mode control instruction. In an embodiment of the present disclosure, after the first device enters the information reading mode, a response message may be transmitted to the second device to notify the second device that the first device has entered the information reading mode.

At S1011, the state of the first-type data signal terminal of the first device is switched to the first output state, after the first device enters the information reading mode.

In an embodiment of the present disclosure, in the information reading mode, the first device may switch the state of its own first-type data signal terminal 1210 or 2210 to the first output state, to enable the first-type data signal terminal 1210 or 2210 to output a high level, in such a manner that power supply is provided to the communication control chip 310 to enable an operation of the communication control chip 310 and subsequent communication with the communication control chip 310.

In some embodiments of the present disclosure, the method may further include actions at block S21 and block S22 prior to the action at block S101. The action at block S101 may be implemented through the action at block S1012.

At S21, the second mode control instruction is transmitted to the second device. The second mode control instruction is used to instruct the second device to enter the information reading mode.

In an embodiment of the present disclosure, when the first device needs to read the parameter information of the cable 30 stored in the communication control chip 310, the first device may transmit, to the first-type data signal terminal 2210 or 1210 of the second device via the first-type data signal terminal 1210 or 2210, the second mode control instruction instructing the second device to enter the information reading mode. In other embodiments of the present disclosure, the first device may also transmit the second mode control instruction to the second device in other manners, for example, in a wireless manner.

At S22, a response message transmitted by the second device for successful entry into the information reading mode is received.

In an embodiment of the present disclosure, after transmitting the second mode control instruction to the second device, the first device may receive the response message transmitted, in response to the second mode control instruction, by the second device for successful entry into the information reading mode. Based on the response message, the first device may supply power to the communication control chip 310 and transmit a power supply control instruction to the second device, to continue controlling the second device to supply power to the communication control chip 310; or the first device may only transmit a power supply control instruction to the second device, to continue controlling the second device to supply power to the communication control chip 310. Thus, the first device can subsequently communicate with the powered-up communication control chip 310.

At S1012, the state of the first-type data signal terminal of the first device is switched to the first output state based on the received response message.

In an embodiment of the present disclosure, the first device may switch the state of its own first-type data signal terminal 1210 or 2210 to the first output state based on the received response message transmitted by the second device for successful entry into the information reading mode, to enable the first-type data signal terminal 1210 or 2210 to output a high level, in such a manner that power supply can be provided to the communication control chip 310 to enable an operation of the communication control chip 310 and subsequent communication with the communication control chip 310.

Figure 14:
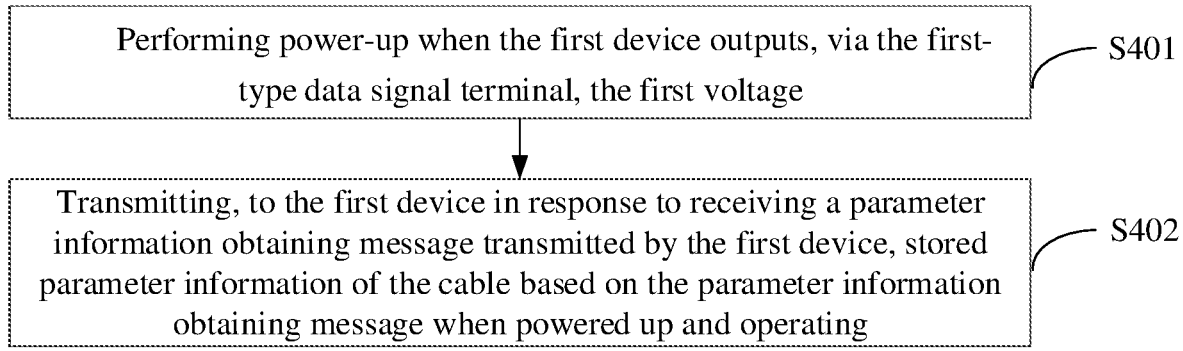
FIG. 14 is an optional flowchart of an information reading method according to an embodiment of the present disclosure.

The present disclosure further provides an information reading method applied in the cable as described above. FIG. 14 is an optional flowchart of an information reading method according to an embodiment of the present disclosure.

At S401, power-up is performed when the first device outputs, via the first-type data signal terminal, the first voltage.

At S402, stored parameter information of the cable is transmitted, in response to receiving a parameter information obtaining message transmitted by the first device, to the first device based on the parameter information obtaining message when powered up and operating.

In some embodiments of the present disclosure, the method may further include the action at block S31 subsequent to the action at block S401.

At S31, power-down is performed when the first device stops outputting, via the first-type data signal terminal, the first voltage.

The method may further include the action at block S41 subsequent to the action at block S401.

At S41, power-down is performed when the first device outputs, via the first-type data signal terminal, the second voltage. The second voltage is lower than the operating voltage of the communication control chip.

Figure 15:
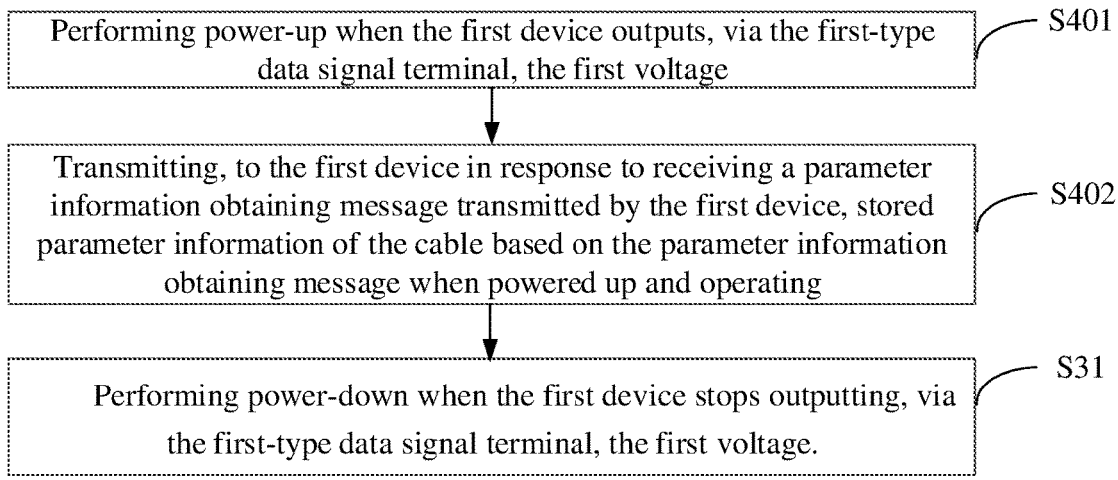
FIG. 15 is an optional flowchart of an information reading method according to an embodiment of the present disclosure.
Figure 16:
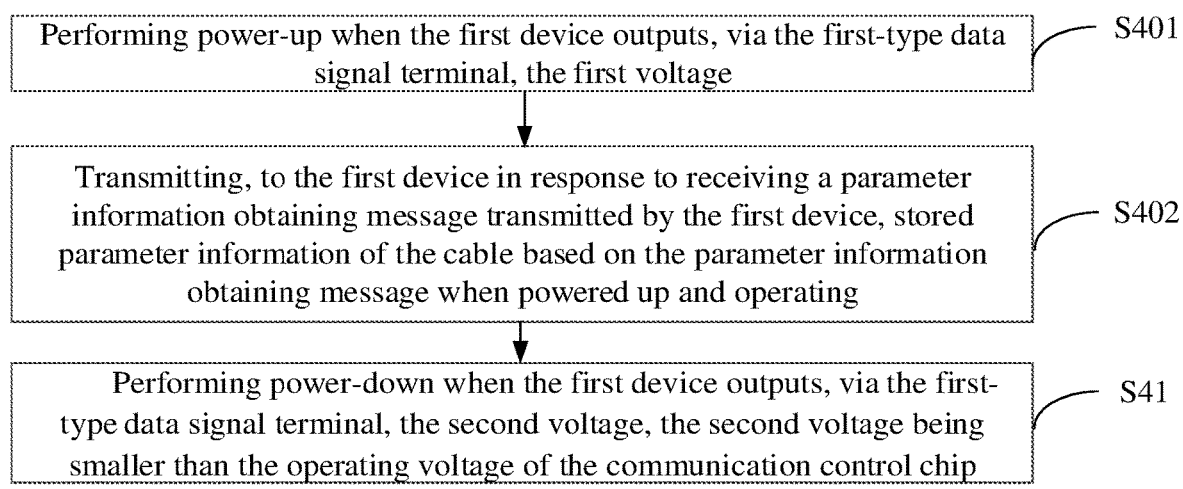
FIG. 16 is an optional flowchart of an information reading method according to an embodiment of the present disclosure.

For example, FIG. 15 is an optional flowchart of an information reading method according to an embodiment of the present disclosure; and FIG. 16 is an optional flowchart of an information reading method according to an embodiment of the present disclosure. As illustrated in FIG. 15 and FIG. 16, the action at block S31 may be executed subsequent to the action at block S402, and the action at block S41 may be executed subsequent to the action at block S402.

In other embodiments, the action at block S31 or the action at block S41 may also be executed subsequent to the action at block S402, and the embodiments of the present disclosure are not limited in this regard.

Figure 17:
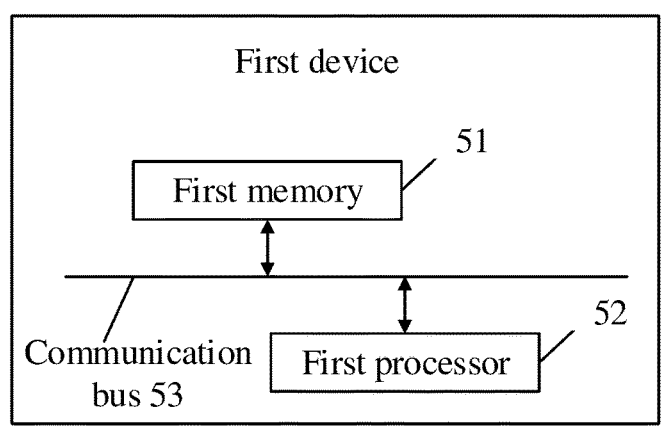
FIG. 17 is a schematic structural diagram of a first device according to an embodiment of the present disclosure.

FIG. 17 is a schematic structural diagram of a first device according to an embodiment of the present disclosure. As illustrated in FIG. 17, the first device includes a first memory 51 and a first processor 52. The first memory 51 and the first processor 52 are connected to each other via a communication bus 53. The first memory 51 is configured to store executable instructions. The first processor 52 includes a device control chip (not illustrated in FIG. 17), and is configured to implement, when executing the executable instructions stored in the first memory 51, the information reading method described above.

Figure 18:
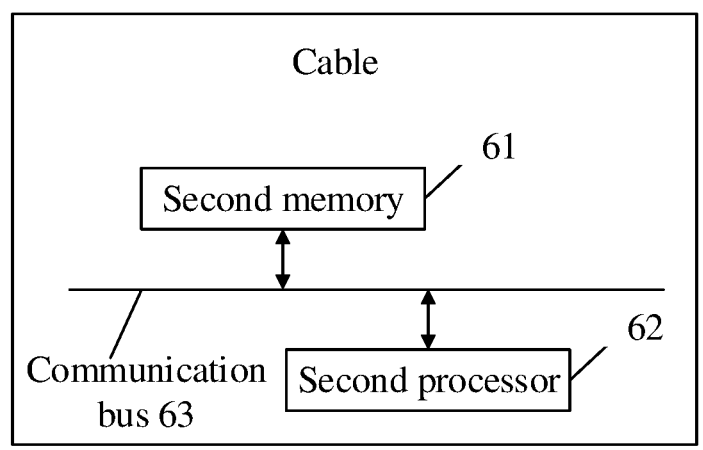
FIG. 18 is a schematic structural diagram of a cable according to an embodiment of the present disclosure.

FIG. 18 is a schematic structural diagram of a cable according to an embodiment of the present disclosure. As illustrated in FIG. 18, the cable includes a second memory 61 and a second processor 62. The second memory 61 and the second processor 62 are connected to each other via a communication bus 63. The second memory 61 is configured to store executable instructions. The second processor 62 includes a communication control chip (not illustrated in FIG. 18), and is configured to implement, when executing the executable instructions stored in the second memory 61, the information reading method described above.

The embodiments of the present disclosure provide a computer program product or computer program. The computer program product or computer program includes computer instructions stored in a computer-readable storage medium or a computer storage medium. A processor of the computer device reads the computer instructions from the computer-readable storage medium or the computer storage medium. The processor executes the computer instructions to cause the computer device to perform the information reading method according to the embodiments of the present disclosure.

The embodiments of the present disclosure provide a computer-readable storage medium or computer storage medium on which executable instructions are stored. The executable instructions, when executed by a first processor, implement the information reading method applied in the first device according to the embodiments of the present disclosure, or the executable instructions, when executed by a second processor, implement the information reading method applied in the cable according to the embodiments of the present disclosure.

In some embodiments, the computer-readable storage medium or computer storage medium may be a memory such as a Ferroelectric Random Access Memory (FRAM), a Read-Only Memory (ROM), a Programmable ROM (PROM), an Erasable PROM (EPROM), an Electrically EPROM (EEPROM), a flash memory, a magnetic surface memory, an optical disc, or a Compact Disc ROM (CD-ROM), or may be a device including one or any combination of the above memories.

In some embodiments, the executable instructions may be in a form of a program, software, a software module, a script, or codes, written in any form of programming language (including a compiled or interpreted language, or a declarative or procedural language), and deployed in any form, including being deployed as a standalone program, or being deployed as a module, a component, a subroutine, or other units suitable for use in a computing environment.

For example, the executable instructions may, but do not necessarily, correspond to a file in a file system, and may be stored as part of a file saving other programs or data, e.g., stored in one or more scripts in a Hyper Text Markup Language (HTML) file, in a single file dedicated to the program in question, or in a number of collaborative files (e.g., a file storing one or more modules, subroutines, or code segments).

As an example, the executable instructions may be deployed to be executed on a single computing device, or on a number of computing devices located at a same position, or on a number of computing devices distributed at different positions and interconnected via a communication network.

In summary, according to the embodiments of the present disclosure, the information reading method, the device, the cable, the charging system, and the computer storage medium provided by the embodiments of the present disclosure require no modifications to the USB interface of the first device and the cable when the first device supplies power to the communication control chip in the cable. Therefore, to a certain extent, it is possible to increase the efficiency of the first device in reading the parameter information of the cable and in supplying power to the communication control chip, improve the compatibility between the USB interface of the first device and the cable, and save the electric energy of the first device supplying power to the communication control chip.

While the embodiments of the present disclosure have been described above, the protect scope of the present disclosure is not limited to these embodiments. Any modifications, equivalent alternatives, and improvements within the spirit and scope of the present disclosure shall be included in the protect scope of the present disclosure.

INDUSTRIAL APPLICABILITY

The present disclosure provides an information reading method, a device, a cable, a charging system, and a computer storage medium. The device includes a device control chip and a first interface. The first interface includes a first-type data signal terminal and a second-type data signal terminal. The first-type data signal terminal is connected to a power supply terminal of a communication control chip of the cable. The second-type data signal terminal is connected to a data signal terminal of the communication control chip. The device control chip is configured to control the first-type data signal terminal to be in a first output state. The first-type data signal terminal is configured to provide, when in the first output state, a first voltage to the power supply terminal, to supply power to the communication control chip. With the present disclosure, compatibility between an interface of the device and the cable can be improved, and efficiency of supplying power to the communication control chip can be increased.

What is claimed is:

1. A first device, connected to a cable, the first device comprising:
   a device control chip; and
   a first interface comprising a first-type data signal terminal and a second-type data signal terminal, the first-type data signal terminal being connected to a power supply terminal of a communication control chip of the cable, and the second-type data signal terminal being connected to a data signal terminal of the communication control chip, wherein:

the device control chip is configured to control the first-type data signal terminal to be in a first output state; and the first-type data signal terminal is configured to provide, when in the first output state, a first voltage to the power supply terminal, to supply power to the communication control chip, wherein the device control chip is further configured to control the first-type data signal terminal to be in an input state; and the first-type data signal terminal is further configured to stop, when in the input state, supplying the first voltage to the power supply terminal, to power down the communication control chip, wherein the first device is connected to a second device via the cable, and wherein the device control chip is further configured to control, while controlling the first-type data signal terminal to be in the input state, the first-type data signal terminal to implement a transmission of a data signal with the second device; and control the second-type data signal terminal to implement a transmission of a data signal with the second device, wherein:

the device control chip is further configured to transmit, via the first-type data signal terminal and/or the second-type data signal terminal, a first mode control instruction to the second device before controlling the first-type data signal terminal to be in the first output state, the first mode control instruction being used to instruct the second device to enter an information reading mode; and the device control chip is further configured to receive, via the first-type data signal terminal and/or the second-type data signal terminal, a first response message returned by the second device based on the first mode control instruction, enter an information reading mode based on the first response message, and control, when in the information reading mode, the first-type data signal terminal to be in the first output state; or the device control chip is further configured to receive, via the first-type data signal terminal and/or the second-type data signal terminal, a second mode control instruction transmitted by the second device; and enter an information reading mode based on the second mode control instruction, and control, when in the information reading mode, the first-type data signal terminal to be in the first output state, the second mode control instruction being used to instruct the first device to enter the information reading mode.

2. The first device according to claim 1, wherein:

the device control chip is further configured to control the first-type data signal terminal to be in a second output state; and the first-type data signal terminal is further configured to provide, when in the second output state, a second voltage to the power supply terminal to power down the communication control chip, the second voltage being lower than an operating voltage of the communication control chip.

3. The first device according to claim 1, wherein:

the device control chip is further configured to control, after the communication control chip is powered up, the second-type data signal terminal, to implement a data transmission with the data signal terminal of the communication control chip.

4. The first device according to claim 1, wherein:

the first-type data signal terminal is a positive data signal terminal, and the second-type data signal terminal is a negative data signal terminal; or the first-type data signal terminal is the negative data signal terminal, and the second-type data signal terminal is the positive data signal terminal.

5. The first device according to claim 1, wherein the first interface is any one of a Type-A, Type-C, or Micro-B interface.

6. A cable, connected to a first device, the cable comprising a communication control chip, wherein:

the communication control chip comprises a power supply terminal and a data signal terminal, the power supply terminal being connected to a first-type data signal terminal in a first interface of the first device, and the data signal terminal being connected to a second-type data signal terminal in the first interface of the first device; and the communication control chip is configured to control itself to be powered up, in response to receiving, via the power supply terminal, a first voltage outputted by the first-type data signal terminal, wherein a device control chip of the first device is configured to control the first-type data signal terminal to be in an input state; and the first-type data signal terminal is further configured to stop, when in the input state, supplying the first voltage to the power supply terminal, to power down the communication control chip, wherein the first device is connected to a second device via the cable, and wherein the device control chip of the first device is further configured to control, while controlling the first-type data signal terminal to be in the input state, the first-type data signal terminal to implement a transmission of a data signal with the second device; and control the second-type data signal terminal to implement a transmission of a data signal with the second device, wherein:

the device control chip is further configured to transmit, via the first-type data signal terminal and/or the second-type data signal terminal, a first mode control instruction to the second device before controlling the first-type data signal terminal to be in the first output state, the first mode control instruction being used to instruct the second device to enter an information reading mode; and the device control chip is further configured to receive, via the first-type data signal terminal and/or the second-type data signal terminal, a first response message returned by the second device based on the first mode control instruction, enter an information reading mode based on the first response message, and control, when in the information reading mode, the first-type data signal terminal to be in the first output state; or the device control chip is further configured to receive, via the first-type data signal terminal and/or the second-type data signal terminal, a second mode control instruction transmitted by the second device; and enter an information reading mode based on the second mode control instruction, and control, when in the information reading mode, the first-type data signal terminal to be in the first output state, the second mode control instruction being used to instruct the first device to enter the information reading mode.

7. The cable according to claim 6, wherein:

the communication control chip is further configured to control itself to be powered down, in response to receiving, via the power supply terminal, a second voltage outputted by the first-type data signal terminal, the second voltage being lower than an operating voltage of the communication control chip.

8. The cable according to claim 6, wherein:
the communication control chip is further configured to control itself to be powered down, in response to failing to receive, via the power supply terminal, a voltage outputted by the first-type data signal terminal.

9. The cable according to claim 6, wherein:
the communication control chip is further configured to implement a transmission of a data signal with the first device via the data signal terminal when powered up.

10. The cable according to claim 6, comprising:
a second interface comprising a third data terminal and a fourth data terminal;
a first signal line; and
a second signal line, wherein:
the third data terminal is connected to the first signal line, and the fourth data terminal is connected to the second signal line;
the first-type data signal terminal is connected to the power supply terminal, via the third data terminal and the first signal line; and
the second-type data signal terminal is connected to the data signal terminal, via the fourth data terminal and the second signal line.

11. The cable according to claim 10, wherein:
the first interface further comprises a charging terminal and a first ground terminal;
the second interface further comprises an electrical signal transmission terminal and a second ground terminal;
a power supply control chip further comprises a third ground terminal;
the charging terminal is connected to the electrical signal transmission terminal; and
the first ground terminal and the third ground terminal are both connected to the second ground terminal.

12. A charging system, comprising:
a chargeable device;
a power supply device; and
a cable, wherein:
the chargeable device comprises a charging control chip and a charging interface;
the cable comprises a communication control chip;
the power supply device comprises a power supply control chip and a power supply interface;
the charging interface and the power supply interface each comprise a first-type data signal terminal and a second-type data signal terminal;
the communication control chip has a power supply terminal connected to the first-type data signal terminal of the charging interface and the first-type data signal terminal of the power supply interface, and has a data signal terminal connected to the second-type data signal terminal of the charging interface and the second-type data signal terminal of the power supply interface;
the chargeable device is configured to provide a first voltage to the power supply terminal via the first-type data signal terminal of the charging interface while controlling, via the charging control chip, the first-type data signal terminal of the charging interface to be in a first output state, to supply power to the communication control chip; and/or
the power supply device is configured to provide a first voltage to the power supply terminal via the first-type data signal terminal of the power supply interface while controlling, by means of the power supply control chip, the first-type data signal terminal of the power supply interface to be in a first output state, to supply power to the communication control chip,
wherein the chargeable device is connected to the supply device via the cable, and wherein the chargeable device controls, by the charging control chip, the first-type data signal terminal of the charging interface to be in an input state to implement a transmission of the data signal via the first-type data signal terminal of the charging interface, and the power supply device controls, by the power supply control chip, the first-type data signal terminal of the power supply interface to be in the input state to implement transmission of date signals between the chargeable device and the power supply device via the first-type data signal terminal of the charging interface and the first-type data signal terminal of the power supply interface and power down the communication control chip, wherein:
the charging control chip is configured to transmit, via the first-type data signal terminal of the charging interface and/or the second-type data signal terminal of the charging interface, a first mode control instruction to the power supply device before controlling the first-type data signal terminal of the charging interface to be in the first output state, the first mode control instruction being used to instruct the power supply device to enter an information reading mode; and the charging control chip is further configured to receive, via the first-type data signal terminal of the charging interface and/or the second-type data signal terminal of the charging interface, a first response message returned by the power supply device based on the first mode control instruction, enter an information reading mode based on the first response message, and control, when in the information reading mode, the first-type data signal terminal of the charging interface to be in the first output state; or
the charging control chip is further configured to receive, via the first-type data signal terminal of the charging interface and/or the second-type data signal terminal of the charging interface, a second mode control instruction transmitted by the power supply device; and enter an information reading mode based on the second mode control instruction, and control, when in the information reading mode, the first-type data signal terminal of the chargeable interface to be in the first output state, the second mode control instruction being used to instruct the charging device to enter the information reading mode.

13. The charging system according to claim 12, wherein:
the second-type data signal terminal comprises a first data signal sub-terminal and a second data signal sub-terminal;
the first-type data signal terminal comprises a third data signal sub-terminal and a fourth data signal sub-terminal;
the first data signal sub-terminal and the third data signal sub-terminal correspond to the chargeable device;
the second data signal sub-terminal and the fourth data signal sub-terminal correspond to the power supply device;
the chargeable device is further configured to perform a data transmission with the data signal terminal via the first data signal sub-terminal after the communication control chip is powered up;
control, by means of the charging control chip, the third data signal sub-terminal corresponding to the charging control chip to be in an input state; and when the third data signal sub-terminal is in the input state, stop providing the first voltage to the power supply terminal to power down the communication control chip, and implement a transmission of a data signal via the third data signal sub-terminal; and/or the power supply device is further configured to perform a data transmission with the data signal terminal via the second data signal sub-terminal after the communication control chip is powered up; control, by means of the power supply control chip, the fourth data signal sub-terminal corresponding to the power supply control chip to be in the input state; and when the fourth data signal sub-terminal is in the input state, stop providing the first voltage to the power supply terminal to power down the communication control chip.

14. The charging system according to claim 12, wherein:

the second-type data signal terminal comprises a first data signal sub-terminal and a second data signal sub-terminal;

the first-type data signal terminal comprises a third data signal sub-terminal and a fourth data signal sub-terminal;

the first data signal sub-terminal and the third data signal sub-terminal correspond to the chargeable device;

the second data signal sub-terminal and the fourth data signal sub-terminal correspond to the power supply device;

the chargeable device is further configured to perform a data transmission with the data signal terminal via the first data signal sub-terminal after the communication control chip is powered up; control, by means of the charging control chip, the third data signal sub-terminal corresponding to the charging control chip to be in a second output state; and provide, to the power supply terminal when the third data signal sub-terminal is in the second output state, a second voltage lower than an operating voltage of the communication control chip to power down the communication control chip; and/or the power supply device is further configured to perform a data transmission with the data signal terminal via the second data signal sub-terminal after the communication control chip is powered up; control, by means of the power supply control chip, the fourth data signal sub-terminal corresponding to the power supply control chip to be in the second output state; and provide, to the power supply terminal when the fourth data signal sub-terminal is in the second output state, a second voltage lower than the operating voltage of the communication control chip to power down the communication control chip.

15. The charging system according to claim 12, wherein:

the chargeable device is a first device, and the power supply device is a second device; the charging control chip is a device control chip, and the charging interface is a first interface; and the chargeable device is configured to be connected to the power supply device via the charging interface and the cable for charging; or the power supply device is the first device, and the chargeable device is the second device; the power supply control chip is the device control chip, and the power supply interface is the first interface; and the power supply device is configured to be connected to the chargeable device via the power supply interface and the cable for charging.

* * * * *